United States Patent [19]
Farwell et al.

[11] Patent Number: 5,543,819
[45] Date of Patent: Aug. 6, 1996

[54] HIGH RESOLUTION DISPLAY SYSTEM AND METHOD OF USING SAME

[75] Inventors: Randall S. Farwell, San Diego; Robert W. Shaw, Escondido; Roger N. Marshall, Solana Beach, all of Calif.

[73] Assignee: Proxima Corporation, San Diego, Calif.

[21] Appl. No.: 155,480

[22] Filed: Nov. 19, 1993

Related U.S. Application Data

[63] Continuation of Ser. No. 845,280, Mar. 3, 1992, abandoned, which is a continuation-in-part of Ser. No. 690,531, Apr. 23, 1991, abandoned, which is a continuation-in-part of Ser. No. 616,178, Nov. 19, 1990, Pat. No. 5,276,436, which is a continuation-in-part of Ser. No. 586,506, Sep. 21, 1990, Pat. No. 5,181,902, which is a continuation-in-part of Ser. No. 546,238, Jun. 29, 1990, abandoned, which is a continuation-in-part of Ser. No. 506,429, Apr. 9, 1990, abandoned, which is a continuation-in-part of Ser. No. 472,668, Jan. 30, 1990, abandoned, which is a continuation-in-part of Ser. No. 222,144, Jul. 21, 1988, abandoned.

[51] Int. Cl.$^6$ ............................................. G09G 5/02
[52] U.S. Cl. .................... 345/150; 345/147; 345/148
[58] Field of Search ............................ 345/88, 89, 147, 345/148, 149, 150, 152, 153

[56] References Cited

U.S. PATENT DOCUMENTS

| | | | |
|---|---|---|---|
| 4,531,160 | 7/1985 | Ehn | 345/147 |
| 4,827,255 | 5/1989 | Ishii | 345/148 |
| 4,838,654 | 6/1989 | Hamaguchi et al. | |
| 4,855,728 | 8/1989 | Mano et al. | |
| 4,864,390 | 9/1989 | McKechnie et al. | |
| 4,906,071 | 3/1990 | Takahara et al. | |
| 4,913,674 | 4/1990 | Nicholas | |
| 4,922,240 | 5/1990 | Duwaer | |
| 4,931,787 | 6/1990 | Shannon | |
| 4,936,656 | 6/1990 | Yamashita et al. | |
| 4,989,954 | 2/1991 | Yokoyama et al. | |
| 4,995,719 | 2/1991 | Shanks | |
| 5,062,001 | 10/1991 | Farwell et al. | |
| 5,091,784 | 2/1992 | Someya et al. | |
| 5,138,303 | 8/1992 | Rupel | 345/150 |
| 5,157,524 | 10/1992 | Dijon et al. | |

FOREIGN PATENT DOCUMENTS

| | | |
|---|---|---|
| 0387033 | 9/1990 | European Pat. Off. |
| 8607650 | 12/1986 | WIPO |
| 9205537 | 4/1992 | WIPO |

Primary Examiner—Ulysses Weldon
Assistant Examiner—Matthew Luu
Attorney, Agent, or Firm—Bernard L. Kleinke

[57] ABSTRACT

A method and system for producing a finely textured display image of a gradation of high color resolution color shading. The high color resolution system is adapted to be coupled to a relatively inexpensive high speed active matrix display panel employing single-bit LCD drivers and a plurality of sub-pixel elements. The system includes a sub-pixel activation circuit for generating single-bit digital signals for driving individual ones of the sub-pixel elements. A duty cycle circuit arrangement controls the sub-pixel activation circuit to cause desired ones of the sub-pixel elements to be activated selectively an average number of times over a large number of consecutive frame time intervals to generate sub-pixel images having desired perceived color shading levels. A fixed pattern generator responsive to a desired color shading level signal, controls the duty cycle circuit arrangement to activate sub-pixel elements to the desired perceived color shading levels and assigns color codes to groups of sub-pixel elements to produce color blending sub-pixel patterns that help to inhibit substantially color contouring between adjacent sub-pixel element images exhibiting a plurality of different color shading levels of a single primary color. The high resolution display system also includes a video interface module for coupling either RGB analog signals or RGB digital signals to the high speed LCD display panel.

29 Claims, 20 Drawing Sheets

FIG. 7e — PATTERN 4

FIG. 7c — PATTERN 3

FIG. 7b — PATTERN 2

FIG. 7d — PATTERN 0

FIG. 7a — PATTERN 1

HIGH RESOLUTION DISPLAY SYSTEM AND METHOD OF USING SAME

CROSS-REFERENCE TO RELATED APPLICATIONS

This is a Continuation of application Ser. No. 07/845,280, filed Mar. 3, 1992 abandoned of Randall S. Farwell, et al. for HIGH RESOLUTION DISPLAY SYSTEM AND METHOD OF USING SAME, which is a continuation-in-part of U.S. patent application Ser. No. 07/690,531 filed Apr. 3, 1991, now abandoned, entitled "VIDEO DISPLAY SYSTEM AND METHOD OF USING SAME," which is a continuation-in-part of U.S. patent application Ser. No. 07/616,178, filed Nov. 19, 1990, now U.S. Pat. No. 5,276,436, entitled "TELEVISION SIGNAL PROJECTION SYSTEM AND METHOD OF USING SAME," which is a continuation-in-part of U.S. patent application Ser. No. 07/586,506 filed Sep. 21, 1990, now U.S. Pat. No. 5,181,902, entitled "HIGH SPEED COLOR DISPLAY SYSTEM AND METHOD OF USING SAME," which is a continuation-in-part of U.S. patent application Ser. No. 07/546,238 filed Jun. 29, 1990, now abandoned, entitled "STACKED DISPLAY PANEL CONSTRUCTION AND METHOD OF MAKING SAME," which is a continuation-in-part of U.S. patent application Ser. No. 07/506,429 filed Apr. 9, 1990, now abandoned, entitled "STACKED DISPLAY PANEL CONSTRUCTION AND METHOD OF MAKING SAME," which is a continuation-in-part of U.S. patent application Ser. No. 07/472,668 filed Jan. 30, 1990, now abandoned, entitled, "LIQUID CRYSTAL DISPLAY PANEL SYSTEM AND METHOD OF USING SAME," which is a CIP of U.S. patent application Ser. No. 07/222,144 filed Jul. 21, 1988, entitled "GRAY SCALE SYSTEM FOR VISUAL DISPLAYS," now abandoned. Each of the above-mentioned patent applications and patent are incorporated herein by reference.

TECHNICAL FIELD

The present invention relates to a high resolution display system, and a method of using it. The invention more particularly relates to such a system and method for use in video display apparatus, such as a system for projecting video images.

BACKGROUND ART

Many computer systems include a microprocessor unit for processing data and an associated monitor for displaying full color video images. Systems which utilize full color monitors or display units typically include analog or digital interfaces, which provide display control functions for the display unit. In this regard, a typical system employs a computer video signal generating source, such as a VGA video card usually employed in a video drive module of a personal computer system. Such a video drive module typically provides analog RGB signals and/or digital RGB signals with accompanying video formatting signals such as HSYNC and VSYNC signals. Other microprocessors may utilize a video drive module for supplying NTSC composite television signals depending upon the type of monitor employed in the system.

Because of the diversity in the different types and kinds of monitors available for such systems, it has been necessary to employ various types of interfaces to accommodate the different kinds of analog and digital video signals, as well as the different types and kinds of signal formats. In this regard, many different types and kinds of interfaces adapted for coupling a video signal producing device to an associated display unit are known in the prior art. For example, reference may be made to the following U.S. Pat. Nos. 4,531,160; 4,536,856; 4,631,692; 4,760,387; 4,779,083; 4,827,255; and 4,886,343.

U.S. Pat. No. 4,536,856 discloses a video signal display control method and apparatus for providing display control functions for an LCD display device to be attached to an external microprocessor providing output video signals. The apparatus employs an algorithm for processing an output composite video signal to permit display device signal information to be presented to the display device on a scaled-up size or a scaled-down size relative to the physical screen of the LCD display device.

U.S. Pat. No. 4,631,692 discloses another interface adapted for coupling an external microprocessor to an RGB type monitor, where the external microprocessor can only provide a television formatted NTSC signal.

While the above discussed U.S. patents may disclose various types of interfaces for coupling video signal producing devices to various types and kinds of display devices, such interfaces have not proven to be entirely satisfactory for some application, where modern high speed, liquid crystal display monitors are employed.

More particularly, conventional high speed RGB liquid crystal display monitors include a plurality of pixel elements arranged in a matrix array. In this regard, each pixel element in the array, includes an associated group of sub-pixel elements for producing different colors, such as the colors of red, green, and blue. Such sub-pixel elements, are so small in physical size, they are unable to be distinguished by the human eye. Thus, by selecting various combinations of the sub-pixel elements, up to eight different colors can be exhibited by each of the pixel elements. Such a small number of displayable colors however, severely limits the performance of a video signal producing device for generating an analog signal indicative of an infinite number of colors.

Thus, while such a technique of displaying eight different colors on an RGB liquid crystal display monitor may be satisfactory for some applications, it is not entirely satisfactory for those applications requiring a large number of colors to be displayed.

One attempt at solving the above-mentioned color limitation problem, is disclosed in U.S. Pat. No. 4,827,255 where a video signal producing device is coupled to an RGB digital display device for producing up to 3375 or $15^3$ different color shades. In this regard, a gray scale technique is employed where a series of display patterns having an area of 2 dots×2 lines are displayed repeatedly at a cycle or period of every 8 frames.

While such an interface has proven satisfactory for many applications, such an interface is relatively expensive as it requires the utilization of a multiple panel display device, or a multiple number of drivers for each bit of digital information supplied to the liquid crystal panel. Moreover, such an interface and method suffers from loss of color information and creates a repetitive beat pattern so that displayed images tend to flicker.

Therefore, it would be highly desirable to have a new and improved high resolution display system and method for displaying a large number of different color shading levels utilizing a low cost single panel liquid crystal display device, employing low cost single bit drivers. Moreover, such a system should eliminate, or at least greatly reduce, the loss of color resolution and color information.

Another problem associated with prior known interfaces is known as "contouring." In this regard, because an analog RGB signal is indicative of an infinite number of discrete shading levels, it has been difficult to digitize such an analog signal so that color shade differences in the same primary color sufficiently blend to avoid forming lines of separation when displayed.

A well known technique for eliminating or for at least greatly reducing contouring has been to quantize the supplied analog signal with a sufficient number of digital bits, for example with eight digital bits of data, in order to provide a sufficient number of discrete color shading levels to avoid contouring.

While such a technique provides a sufficient number of discrete color shading levels, such a technique has not proven satisfactory for active matrix display panel units which employ only single bit LCD drivers. More particularly, because a sub-pixel element can only be turned on or off, sophisticated duty cycling techniques have been necessary to obtain only a small number of different shading levels of the same color. Such small numbers, of fifteen or less shading levels, have not been sufficient enough to reduce contouring substantially.

Therefore, it would be highly desirable to have a new and improved high resolution display system and method for displaying a large number of different color levels of the same primary color in order to eliminate or to at least greatly reduce contouring problems associated with low cost active matrix display units employing single bit LCD drivers.

DISCLOSURE OF INVENTION

Therefore, the principal object of the present invention is to provide a new and improved display system and method for producing a large number of shades of color with a fine texture of gradation of high resolution color shading, and with a few number of information bits, such as a single bit of information, for each sub-pixel element of the display system.

Another object of the present invention is to provide such a new and improved system and method, which eliminates or at least reduces greatly the loss of color resolution and color information in displayed images.

A further object of the present invention is to provide such a new and improved method and system, which eliminates or at least reduces greatly contouring in displayed images.

Briefly, the above and further objects of the present invention are realized by providing a method and system, which produces a finely textured display image of a gradation of high resolution color shading. The system accomplishes the high resolution color image with a large number of color shadings, even with only a single bit of information supplied to its display panel for each one of its sub-pixel elements.

The system is adapted to be coupled to a relatively inexpensive high speed active matrix display panel employing single-bit LCD drivers and a plurality of sub-pixel elements. The high resolution display system includes a sub-pixel activation circuit for generating single-bit digital signals for driving individual ones of the sub-pixel elements. A duty cycle circuit arrangement controls the sub-pixel activation circuit to cause desired ones of the sub-pixel elements to be activated selectively an average number of times over a large number of consecutive frame time intervals to generate sub-pixel images having desired perceived color shading levels. A fixed pattern generator responsive to a desired color shading level signal, controls the duty cycle circuit arrangement to activate sub-pixel elements to the desired perceived color shading levels and assigns color codes to groups of sub-pixel elements to produce color blending sub-pixel patterns that help to inhibit substantially color contouring between adjacent sub-pixel element images exhibiting a plurality of different color shading levels of a single primary color.

The high resolution display system also includes a video interface module for coupling either RGB analog signals or RGB digital signals to the high speed LCD display panel.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 6A is a block diagram of a red odd/even sub-pixel logic module of FIG. 5;

BEST MODE FOR CARRYING OUT THE INVENTION

The detailed description of the present invention is organized in accordance with the following outline:
A. General System Description (FIG. 1)
B. Active Matrix LCD Panel
C. Interface Unit
D. LCD Controller
  D.1. Color Shade Sub-Pixel Arranger
    D.1.1 Detailed Description of Color Shade Sub-Pixel Arranger
    D.1.2 Pattern Logic
    D.1.3 Pattern Logic Equations and Truth Table
    D.1.4 Bit Map Memory Controller
  D.2. Sub-Pixel Modulator
    D.2.1 Detailed Description of the Sub-Pixel Modulator
    D.2.2 Sequential Counter with Modifier
    D.2.3 ROM translate for Odd and Even
    D.2.4 Greater than Comparison
E. Panel Data Formatter
  A. General System Description (FIG. 1).

Figure 1:
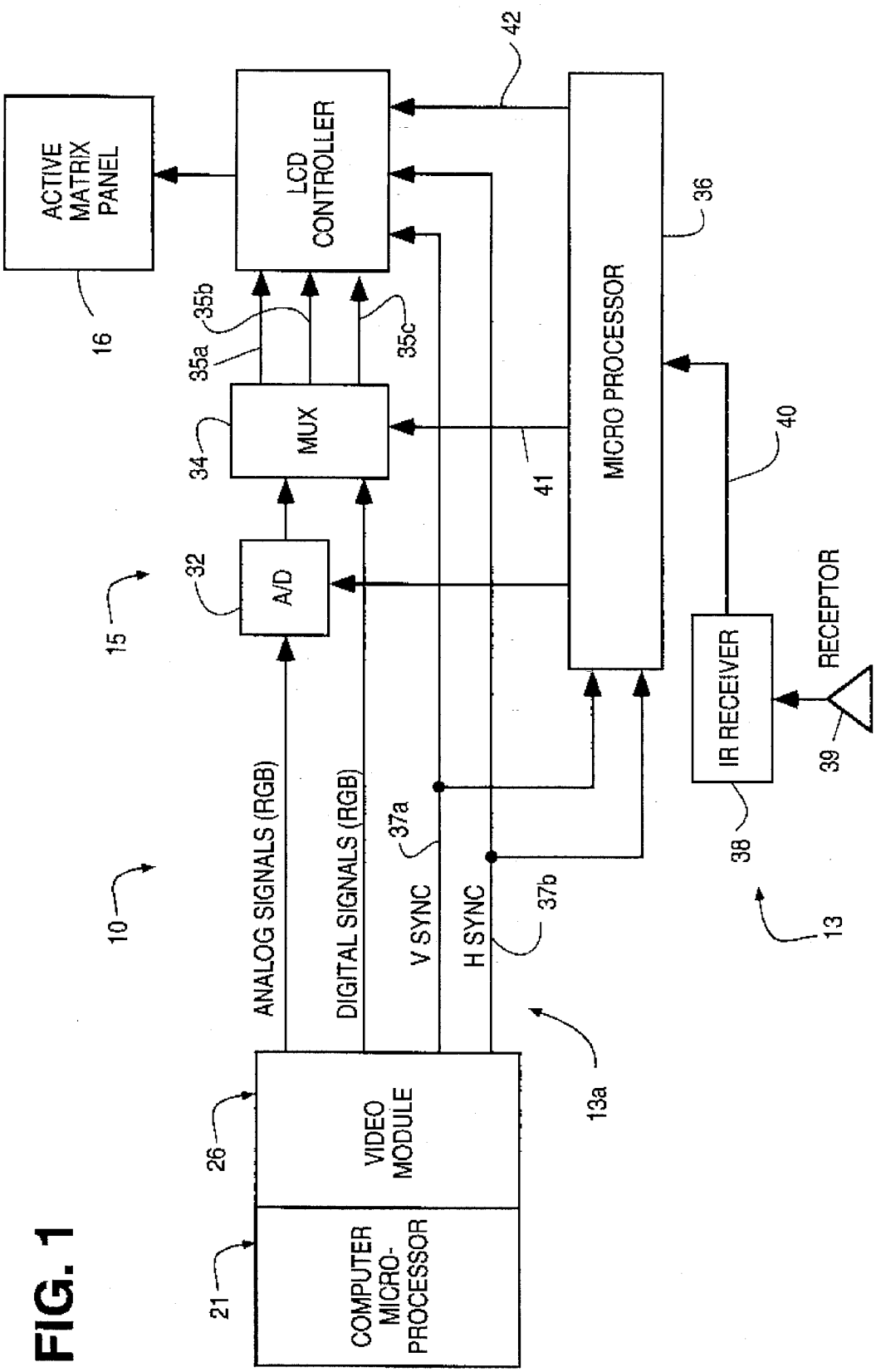
FIG. 1 is a block diagram of a high color resolution system which is constructed in accordance with the present invention, and which is illustrated being coupled between a video signal producing device and an active matrix display panel.

Referring now to the drawings, and more particularly to FIG. 1 thereof, there is shown a high resolution display system 10 which is constructed in accordance to the present invention and which is illustrated coupled between a low cost, high speed display device, such as an active matrix liquid crystal display (LCD) panel 16 and a computer video signal generating source, such as a VGA video drive module 26 driven by a personal computer 21. The high resolution display system 10 responds to a video signal produced by the drive module 26 by transforming the video signal into a plurality of sets of 1-bit digital signals. In this regard, the high resolution display system 10 quantizes and scales the video signal into groups of gray scale coded signals that are mapped into recurring group patterns for each primary color sub-pixel element in order to eliminate or at least reduce substantially contouring between shading levels of the same primary color.

Figure 8:
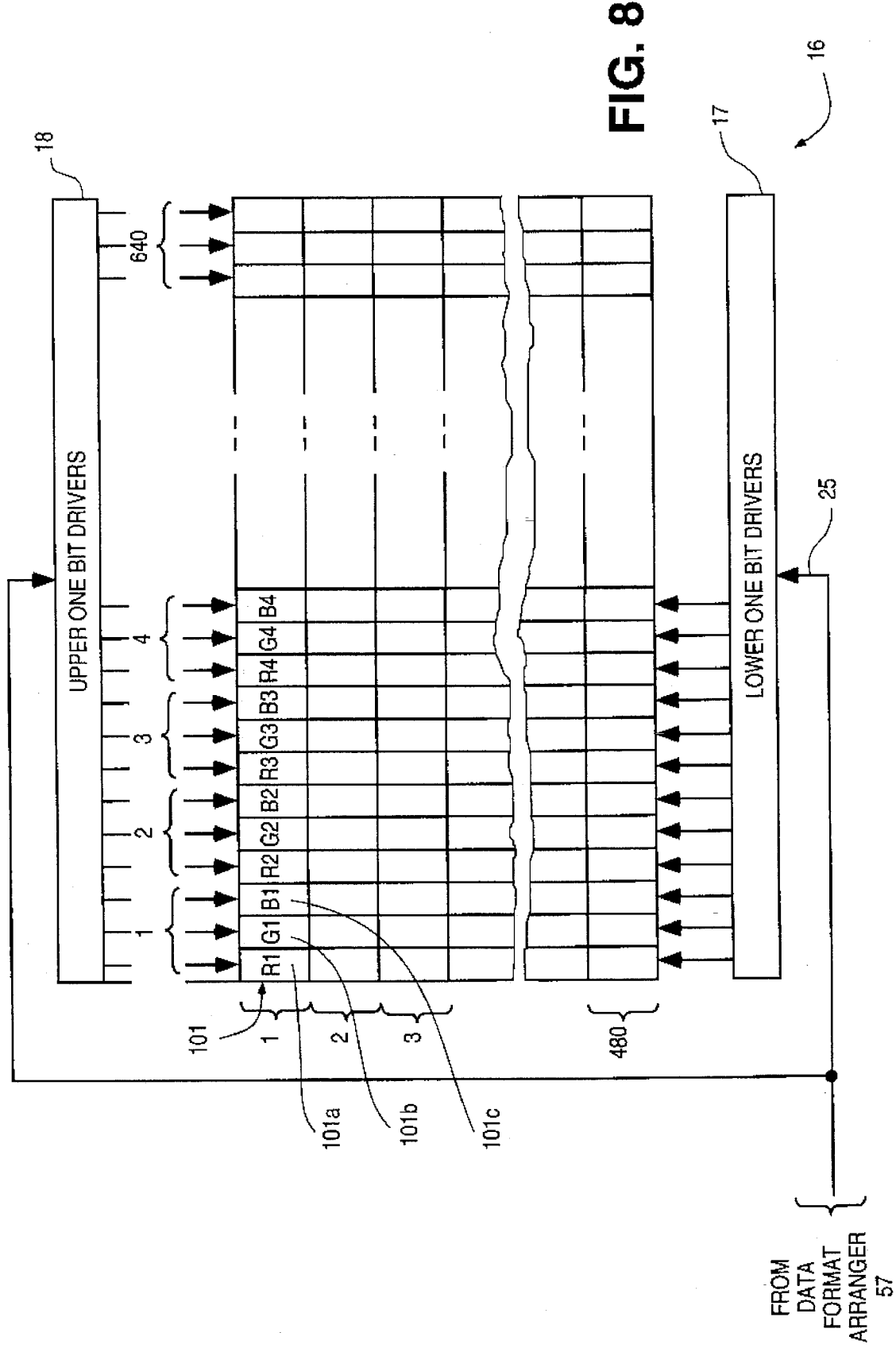
FIG. 8 is a symbolic representation of the active matrix panel of FIG. 1, illustrating a plurality of one bit drivers for energizing individual sub-pixel elements in the panel.

As best seen in FIG. 8, The 1-bit digital signals are arranged in groups of three for driving corresponding sets of sub-pixel elements, such as sub-pixel elements 101A, 101B and 101C, associated with given pixel elements, such as the pixel element 101. Pixel element 101, is one of a plurality of pixel elements arranged in a pixel element matrix array for producing a full color video image via the active matrix panel 16.

The high resolution display system 10 also causes the 1-bit digital signals to be duty cycled at a sufficient rate so that the active matrix panel 16 is able to produce a full color video image having the capability of displaying in excess of ten thousand different color shading level combinations in a substantially flicker free manner.

As best seen in FIG. 1, the high resolution display system 1 generally comprises a video interface controller 13 for coupling the video drive module 26 to the high speed display device 16, and an LCD controller 14 for translating the signals received from the video module 26 into the plurality of sets of 1-bit digital signals.

The video interface controller 13 includes a microprocessor 36 for formatting the video signal produced by the drive module 26 for displaying full color images on the display device 16, and a multiplexing arrangement 15 for converting the signals received from the video module 26 into a plurality of sets of three 5-bit digital signals. Each set of 5-bit digital signals, is indicative of the red, green and blue color codes for one group of sub-pixel elements, such as the sub-pixel elements 101A–C associated with pixel element 101 (FIG. 8).

The LCD controller 14 includes a set of sub-pixel arranger units 43–45 (FIG. 3) that quantize the red, green and blue color code 5-bit digital signals into a corresponding set of 3-bit assigned digital signals for each of the sub-pixel elements, such as the sub-pixel elements 101A–C in the sub-pixel element matrix array of the active matrix panel 16. Each 3-bit digital signal is indicative of an assigned gray scale code that enables the active matrix panel 16 to display a full color image having in excess of 10,000 possible color combinations, as will be explained hereinafter in greater detail.

Each of the sub-pixel arrangers 43–45, also assign a set of gray scale contouring inhibiting codes to the sub-pixel elements of each of the pixel elements immediately adjacent to the pixel element assigned with the gray scale code. The assignment of gray scale contouring inhibiting codes is made for each of the individual sub-pixel elements in the adjacent pixel elements in order to eliminate or at least to reduce substantially color step changes between one gray scale code and another gray scale code. In this regard, it should be understood that the assignment of the gray scale contouring inhibiting codes are not made to the group of pixel elements, but rather are made to the individual sub-pixel elements only when the incoming 5-bit digital signal for each sub-pixel element is indicative of the same desired shading level. Such assignments are made on a sub-pixel element by sub-pixel element basis and result in specific sub-pixel image patterns being displayed for helping to reduce contouring effects between images having the same color but different shading levels within the same primary color.

Figure 10:
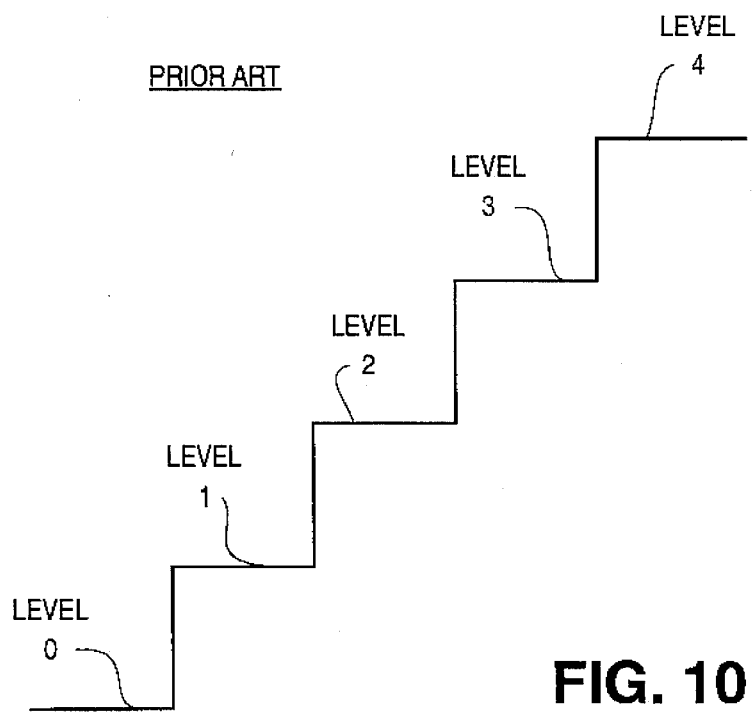
FIG. 10 is a symbolic representation of the color step changes between shading levels of the same primary color as produced by prior known gray scale techniques.

In order to provide a clear understanding of how the LCD controller 14 eliminates or at least greatly reduces contouring effects, FIG. 10 illustrates the step changes between individual shading levels of a given color as shown in the prior art. The large transitions between the individual color shading levels as noted in FIG. 10 cause a contouring effect when an image is displayed having a single primary color with a plurality of different shading levels.

Figure 11:
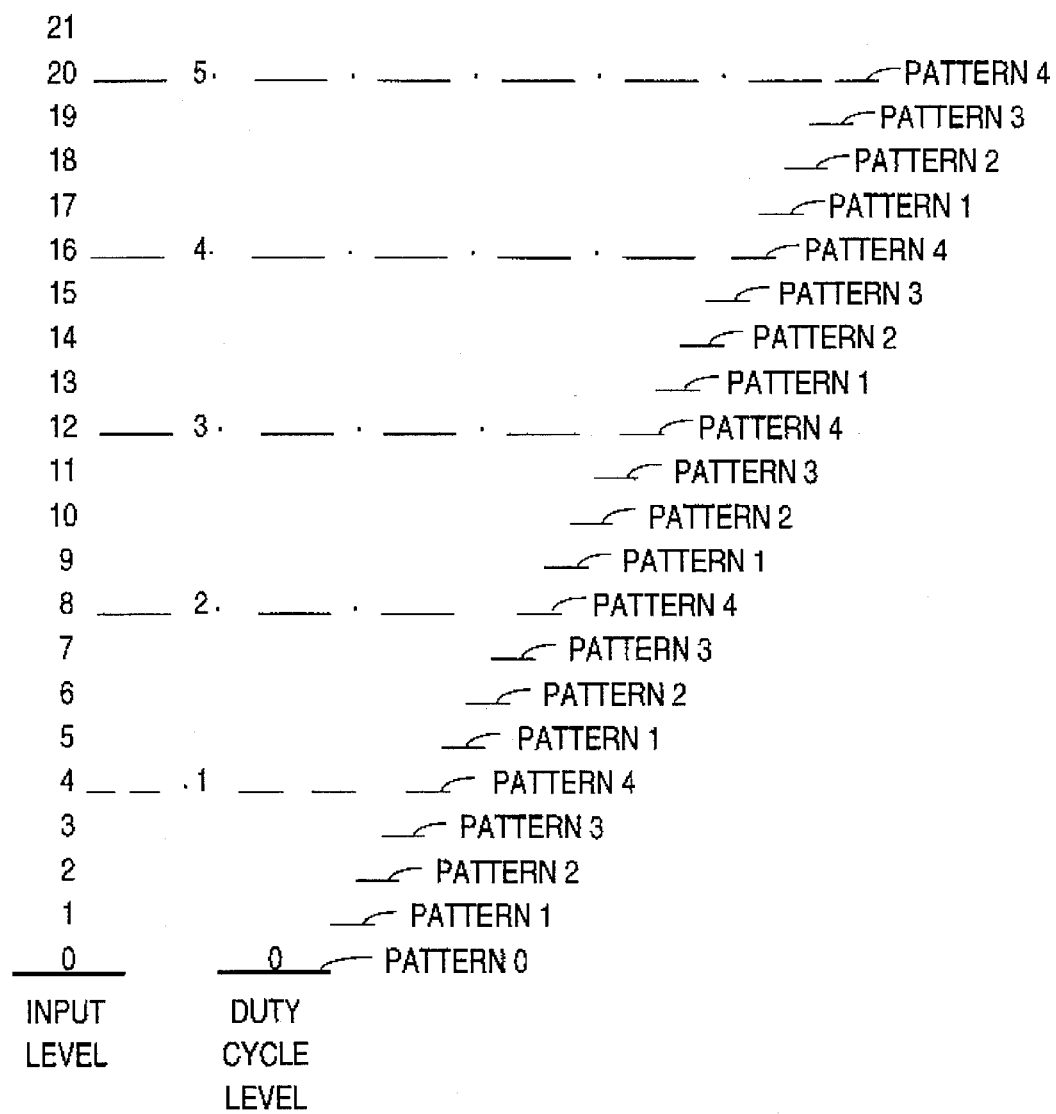
FIG. 11 is a symbolic representation of the color step changes between shading levels of the same color as effected by the apparatus of FIG. 1.
Figure 12:
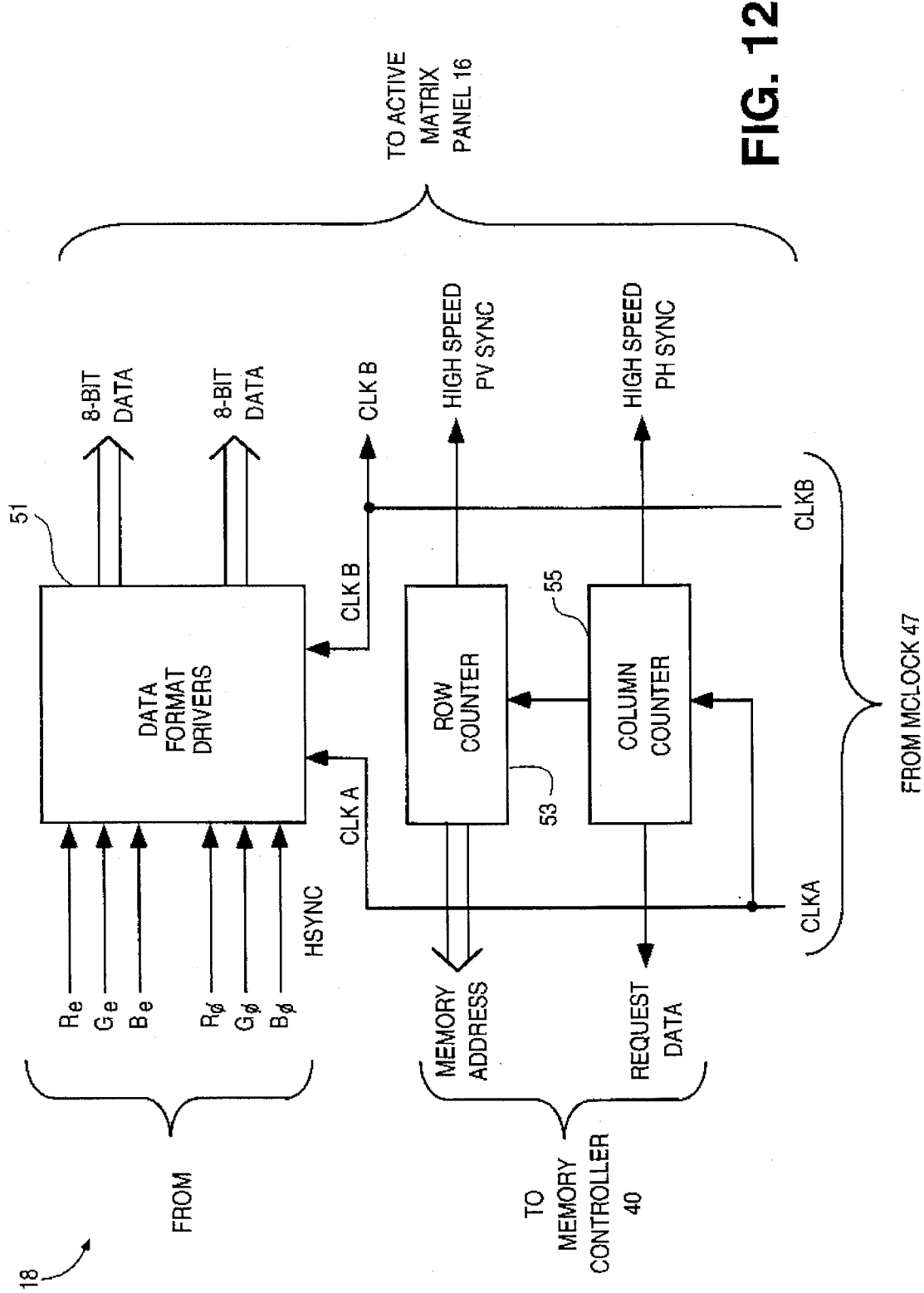
FIG. 12 is a block diagram of the data format unit of FIG. 5.
Figure 12A:
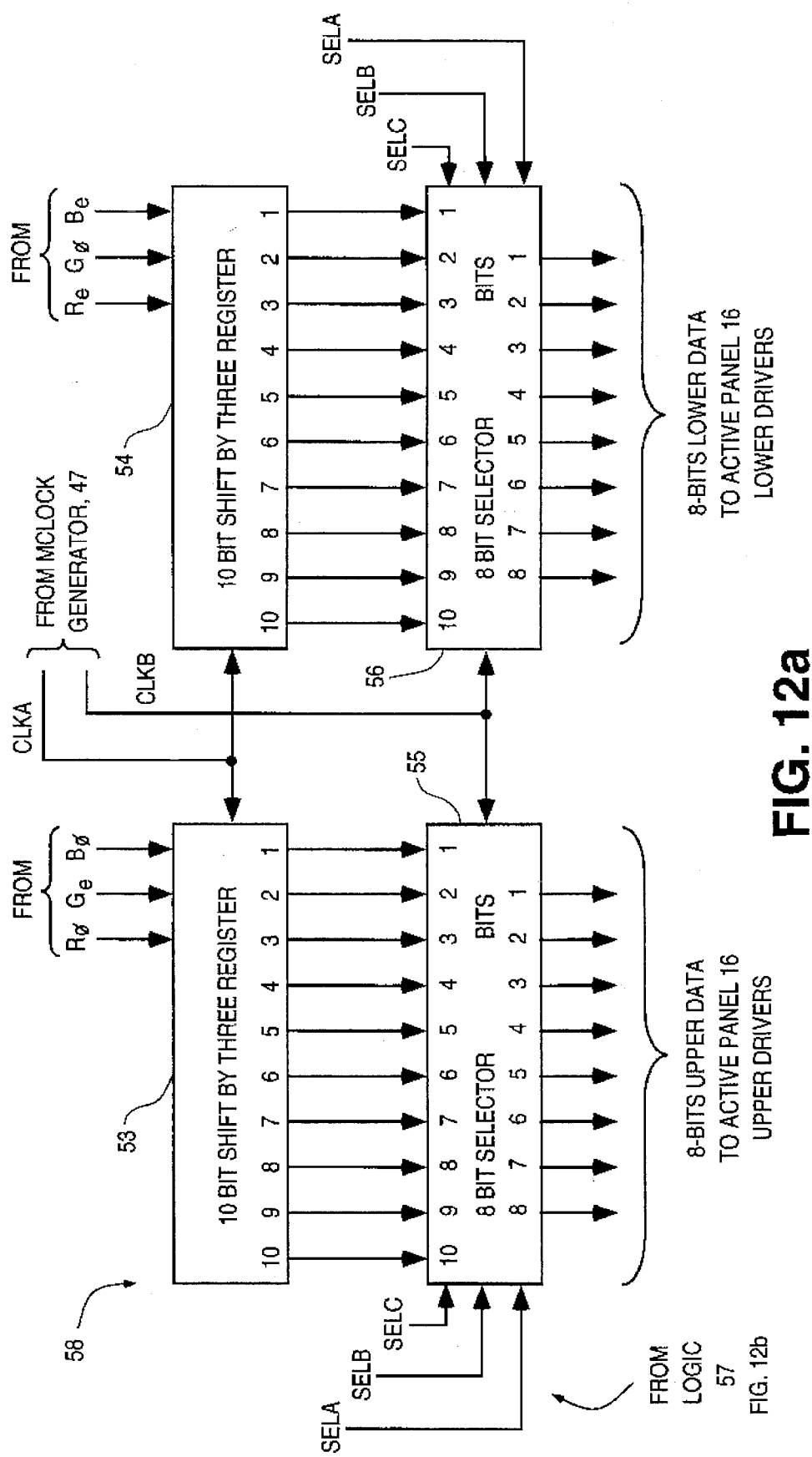
FIG. 12A is a block diagram of the data format drivers of FIG. 12.
Figure 12B:
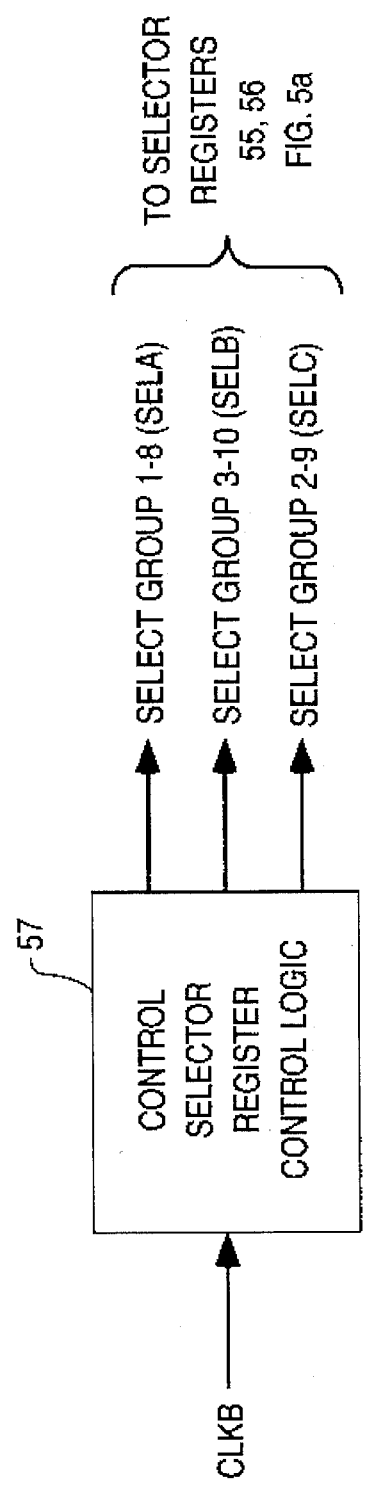
FIG. 12B is a block diagram of the control select register control logic of FIG. 12.
Figure 12C:
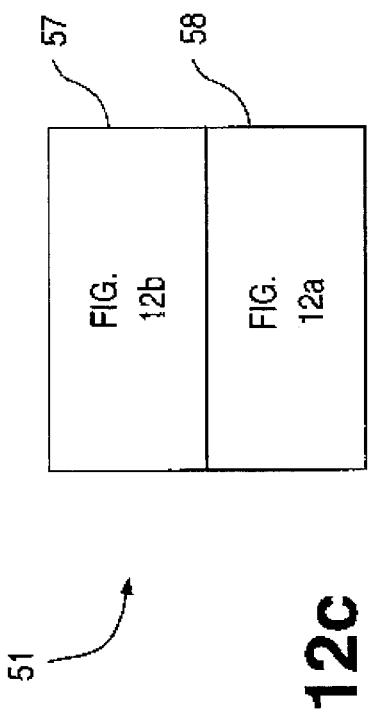
FIG. 12C is a block diagram of a data format arranger of FIG. 6.

FIG. 11 illustrates the effect of assigning the gray scale contouring inhibiting codes to the sub-pixel elements in the pixel element surrounding the pixel element with given assigned gray scale codes. In this regard, the arrangers 43–45 enable the transitions from one color shading level to another color shading level to be spread out over a series of smoothly rounded steps that eliminate substantially contouring effects between shading levels in a single primary color.

In order to blend or to cause the smooth transitions between color shading levels within a given primary color, the LCD controller 14 also includes a sub-pixel modulator arrangement 49 that causes the 3-bit digital signals to be transformed into 1-bit digital signals that turn on and off at a given duty cycle rate over a large number of successive frames of a displayed image. In this regard, the 1-bit digital signals are turned on and off at a sufficient rate so that each sub-pixel element is energized a sufficient number of times over a large number of successive frames to cause their associated sub-pixel images to closely approximate their assigned gray scale codes.

In operation, the sub-pixel modulator arrangement 49 generates a series of single-bit digital signals for driving each of the sub-pixel elements in the active matrix panel 16. In this regard, the sub-pixel modulator 49 controls the single-bit digital signals to activate desired ones of the sub-pixel elements selectively to generate sub-pixel images having desired or given intensity levels. The generated sub-pixel images are then combined with adjacent sub-pixel images and perceived by the eye of a viewer as a pixel image having in excess of 10,000 possible different color combinations.

In order to activate adjacent ones of the sub-pixel elements to produce a pixel image without noticeable contouring, the sub-pixel arrangers 43–45 respond to desired color shading level signals produced by video module 26 to assign gray scale codes to individual sub-pixel elements and gray scale contouring inhibiting codes to the sub-pixel elements of each of the pixel elements adjacent to the pixel elements assigned with the gray scale codes. In this regard, the sub-pixel images developed from the assigned gray scale codes are combined with sub-pixel images developed from the assigned gray scale contouring inhibiting codes to produce pixel images without any substantially noticeable contouring.

B. Active Matrix LCD Panel

Considering now the active matrix panel 16 in greater detail with reference to FIGS. 1 and 8, the active matrix panel 16, includes a pixel element matrix array for generating a selected number of pixel images arranged in a 640 by 480 pixel array. Each pixel element includes a group of associated sub-pixel elements for producing colors such as the primary colors of red, green, and blue to form full color video images from the real time data supplied by the computer 21. In this regard, the matrix of pixel elements are arranged in rows or lines, such as lines 1–480 and columns, such as columns 1–640 to define the 480×640 pixel array shown generally at 19 in FIG. 8. Each pixel element in the pixel array 19 is substantially identical therefore only pixel element 101 will be described hereinafter in greater detail. The active matrix panel 16 also includes a pair of one bit driver sets 17 and 18, to turn the individual sub-pixel elements, such as elements 101A–C on or off depending upon the data signals and control signals present. The active matrix panel 16 is more fully described in copending U.S. patent application Ser. No. 07/586,506 referenced herein.

Considering now pixel element 101 in greater detail with reference to FIG. 8, pixel element 101 generally comprises a set of sub-pixel elements that includes a red sub-pixel element 101A, a green sub-pixel element 101B and a blue sub-pixel element 101C. The sub-pixel elements 101A–C produce individual sub-pixel images which are perceived by the eye of a viewer as a single pixel image having a desired color shading level.

As will be explained hereafter in greater detail, the LCD controller 14, causes selected ones of the active matrix sub-pixel elements in each of the pixel elements in the active matrix panel 16, to be assigned gray scale color codes, indicative of the input video signal to form color combinations with the other sub-pixel elements indicative of subtle shades of color. In this regard, the input data for pixel element 101 can be selectively assigned to one of at least 8 shades of color for each of the primary colors red, green and blue. The sub-pixels 101A, 101B, and 101C are then modulated by a duty cycle technique produced via the sub-pixel modulator unit 49, to represent the assigned color shading. However, to represent a large number of subtle shades of color, the color code assignments for the various sub-pixels are spread out over a large area of the sub-pixel element array as shown in FIGS. 7A–E so that the overall color transition effect, after duty cycling the sub-pixel element signals is smoothed over by the viewer's eyes. Thus, by combining selectively certain ones of the pixel and sub-pixel elements and duty cycling the sub-pixel element signals in a high speed fashion, in excess of 10,000 different color combinations may be produced.

Those skilled in the art will recognize that the present invention is not limited to active matrix LCD panels of 640 by 480 resolution. In this regard, any suitable resolution LCD panel can be employed with the appropriate scaling of the various disclosed patterns and circuits. Nor is there any limitation to the use of active matrix panels. In this regard, as will be explained hereinafter in greater detail, the present invention may also be used with any form of passive matrix panels that are amenable to duty cycle color shading techniques, as well as with multiple or stacked panel arrangements of the color stripe panel shown in FIG. 8. The disclosed invention may also be used with LCD panels having driver arrangements of other than one bit drivers, provided the driver arrangements are capable of being substantially modulated to produce shades of color.

C. Interface Unit

Figure 3:
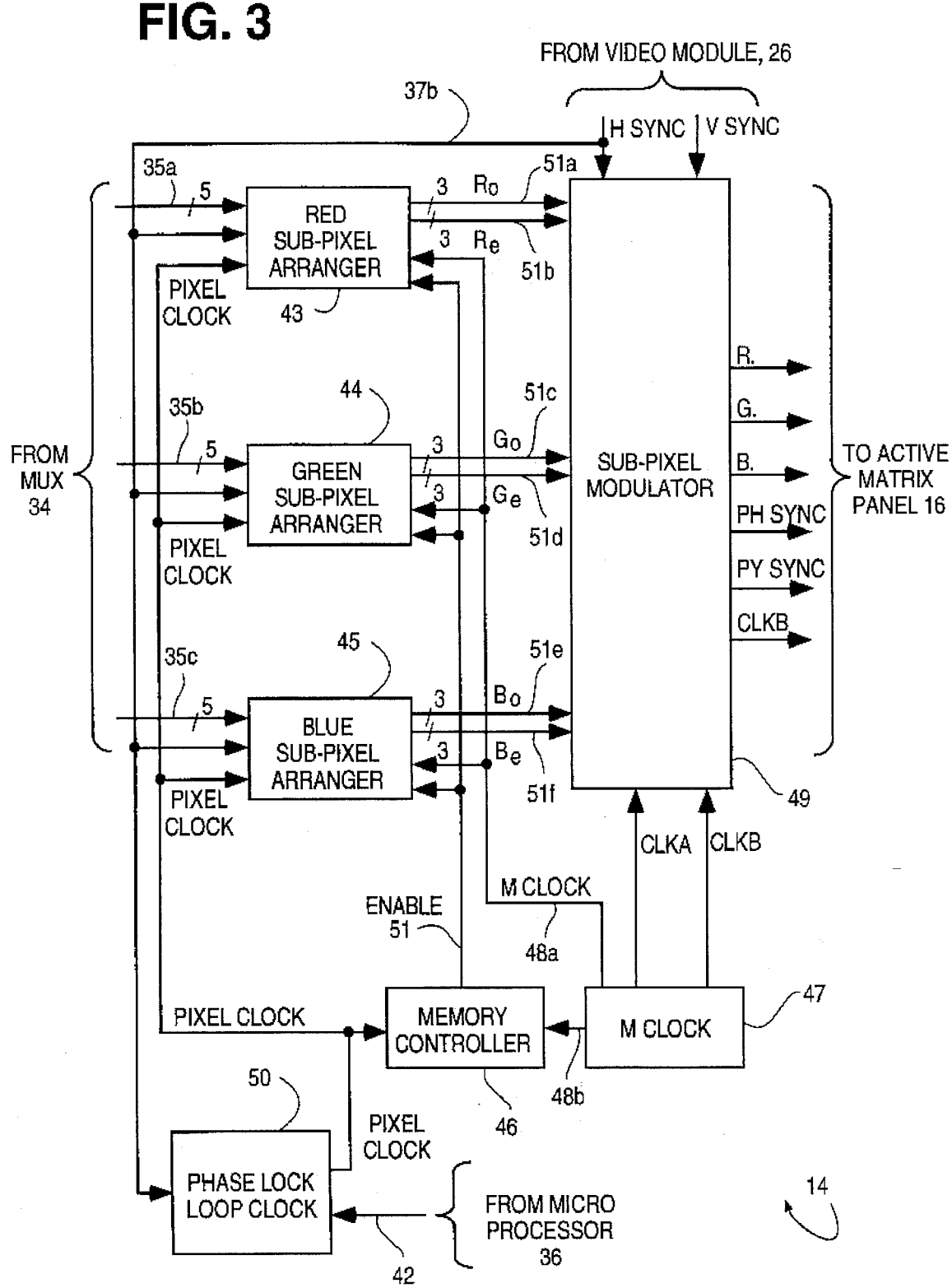
FIG. 3 is a block diagram of a liquid crystal display controller of FIG. 1.

Considering now the video interface controller unit 13 in greater detail with reference to FIG. 3, the multiplexing arrangement 15 generally includes an analog to digital (AD) converter arrangement 32 for converting the analog RGB computer video signals into their digital form. The multiplexing arrangement 15 also includes a multiplexer 34 for receiving either the above mentioned converted analog signals or the RGB digital signals produced by the video module 26. The microprocessor 36 controls the multiplexer 34 so that its output signals are produced from either the digital computer signals from the video module 26 or the output signals from the AD converter arrangement 32. The output signals from the multiplexer 34 are arranged into a group of red digital signals a group of green digital signals and a group of blue digital signals that are coupled to the LCD controller via a set of conductors 35a–c respectively. The multiplexer 34 is more fully described in copending application Ser. No. 07/586,506.

In operation, the interface controller 13 via the microprocessor 36, recognizes whether the incoming computer video signal is either an analog or digital RGB video signal and what horizontal and vertical synchronization rates are required for formatting the incoming video signal for display purposes. In this regard, the microprocessor 36 samples the horizontal and vertical sync signals, HSYNC and VSYNC respectively, received from the computer video module 26 on conductors 37b and 37a respectively. The microprocessor 36 determines the signal mode and resolution of the incoming video signal so that the proper control signals can be sent to the multiplexer 34 and to the LCD controller 14. The control signals are supplied to the multiplexer 34 and the controller 14 on a pair of conductors 41 and 42 respectively. Once the microprocessor 36 determines the type of video standard to be supplied to the LCD controller 14, the microprocessor 36 generates appropriate format data and commands on command lines 41 and 42 for establishing a proper sample rate and format of the lines and pixel locations for driving the active matrix unit 16.

Figure 2:
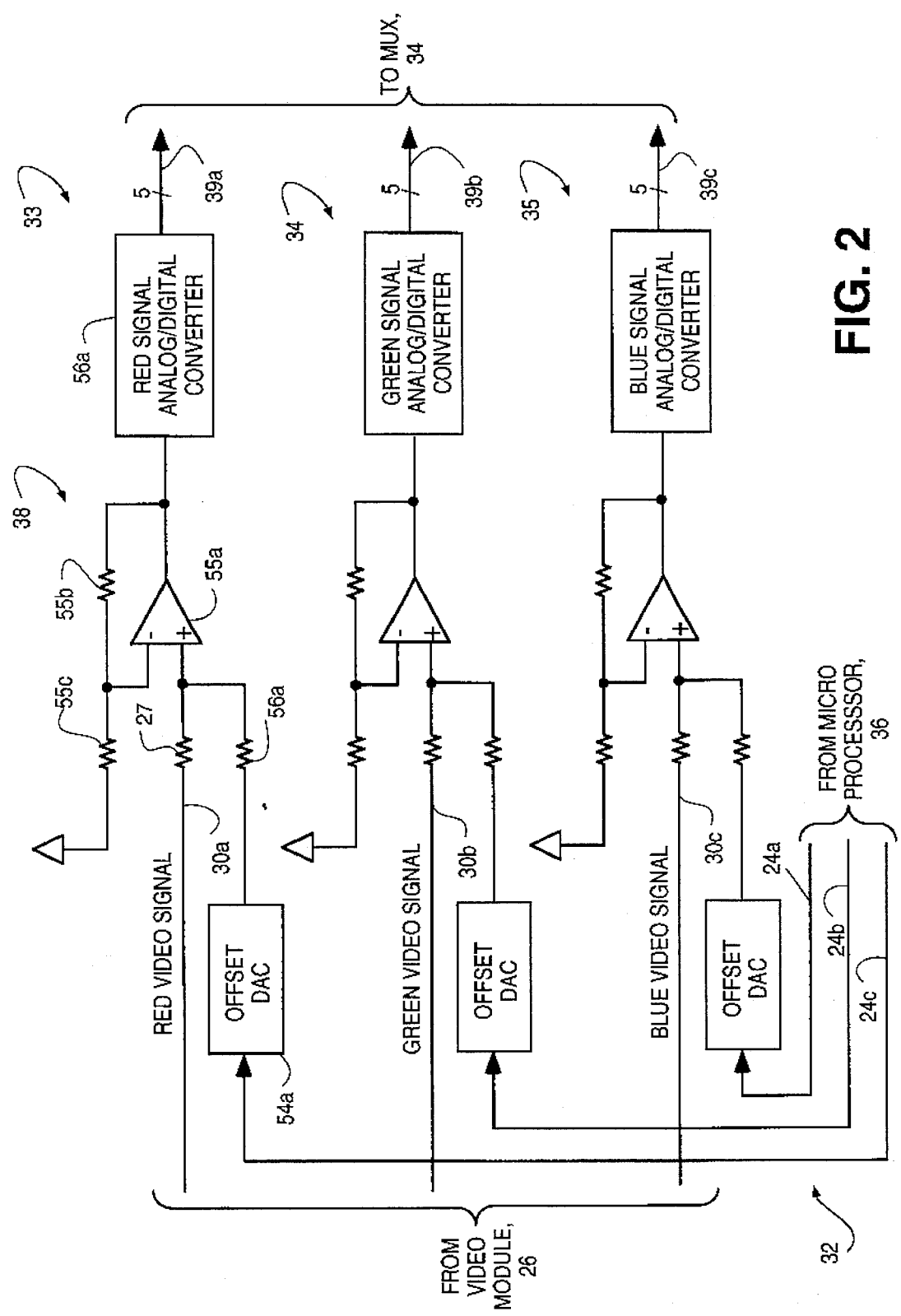
FIG. 2 is a block diagram of an analog to digital interface arrangement illustrated in FIG. 1.

Considering now the analog to digital converter arrangement 32 in greater detail in reference to FIGS. 1 and 2, the arrangement 32 generally includes a set of three processing circuits 33, 34, 35 for converting the raw red, green and blue video signals respectively, supplied by the video drive module 26. Each processing circuit is controlled by the microprocessor 36 and is connected thereto by a set of conductors 24a–c respectively. As each of the processing circuits 33, 34 and 35 are substantially identical only processing circuit 33 will be described hereinafter in greater detail.

Considering now processing circuit 33 in greater detail with reference to FIG. 2, the processing circuit 33 generally comprises an analog to digital converter 56a for converting the raw incoming red video signal into a 5-bit digital signal for processing by the controller 14. The processing circuit 33 also includes a voltage normalizing arrangement 38 for adjusting or normalizing the voltage of the incoming video signal so that it can be processed by the controller 12.

Considering now the normalizing arrangement 38 in greater detail with reference to FIG. 2, the normalizing arrangement 38 generally includes an operational amplifier 55a for controlling the strength of the raw red video signal. In this regard, the amplifier 55a is coupled to the video module 26 via a 243 ohm resistor 27.

In order to enable the operational amplifier 55a to control the strength of the incoming signal, a biasing network consisting of a 780 ohm feedback resistor 55b is coupled between the output of the amplifier 55a and its negative input and a 243 ohm resistor 552 connected between ground and the negative input of the amplifier 55a.

The normalizing arrangement 38 also includes an offset digital to analog converter 54a for adjusting or normalizing the input red video signal voltage to a normalized voltage so that it can be amplified by the operational amplifier 55a. The normalize signal is amplified to achieve the optimal use of the incoming raw video signal without the loss of any substantial color information.

In operation, to normalize the incoming video signal, the microprocessor 36 analyzes the input horizontal and vertical synchronization signals to determine the type of video module 26 utilized in the personal computer 21. In this regard, the microprocessor 36 includes an algorithm for accessing a lookup table that correlates the various types of video modules with their associated HSYNC and VSYNC signals. The lookup table is illustrated in Table I.

TABLE I

Video Source Identification Table

| Computer Mode | Resolution (H × V) | H SYNC KhZ POLARITY | V SYNC Hz POLARITY | DOT CLK (MHz) | DIVISION RATIO |
|---|---|---|---|---|---|
| APPLE//e | | 15.750 COMP | 59.9 COMP | 14.318 | 909 |
| APPLE II GS | | 15.750 COMP | 59.9 COMP | 14.318 | 909 |
| AT&T 6300 | 640 × 400 | 25.87 HIGH | 59.9 HIGH | 24.000 | 927 |
| CGA | 640 × 200 | 15.69 HIGH | 59.9 HIGH | 14.318 | 912 |
| EGA | 640 × 350 | 21.85 HIGH | 59.70 LOW | 16.257 | 745 |
| HGC GRAPHICS | 720 × 348 | 18.51 HIGH | 50.0 LOW | 16.000 | 864 |
| HGC TEXT | 720 × 348 | 18.14 HIGH | 49.0 LOW | 16.000 | 882 |
| MAC II CX 12" RGB MON | 512 × 384 | 24.48 COMP | 60.2 COMP | 15.667 | 640 |
| MAC II CX 13" RGB MON | 640 × 480 | 34.97 COMP | 66.66 COMP | 30.240 | 864 |
| MAC II CI 12" RGB MON | 512 × 384 | 24.480 COMP | 60.14 COMP | 15.667 | 640 |
| MAC II CI 13" RGB MON | 640 × 480 | 35.000 COMP | 66.7 COMP | 30.240 | 864 |
| MAC CLASSIC | 612 × 342 | 22.25 SQ | 60.1 LOW | 15.667 | 704 |
| MAC LC 12" RGB MON | 512 × 384 | 24.48 COMP | 60.14 COMP | 15.667 | 640 |
| MAC LC 13" RGB MON | 640 × 480 | 34.97 COMP | 66.66 COMP | 31.330 | 896 |
| MAC SE | 512 × 342 | 22.250 SQ | 60.10 LOW | 15.667 | 704 |
| MAC SI 13" RGB MON | | | | | |
| NEC PC-9801 | 640 × 400 | 24.83 LOW | 56.40 LOW | 21.055 | 848 |

TABLE I-continued

Video Source Identification Table

| Computer Mode | Resolution (H × V) | H SYNC KhZ POLARITY | V SYNC Hz POLARITY | DOT CLK (MHz) | DIVISION RATIO |
|---|---|---|---|---|---|
| NTSC VIDEO | | 15.75 HIGH | 60 HIGH | 14.3 | 911 |
| OLIVETTI OEC-CGA | 640 × 400 | 25.86 HIGH | 59.6 HIGH | 24.000 | 927 |
| OLIVETTI OEC-EGA | 640 × 360 | 25.86 HIGH | 67.7 LOW | 24.000 | 927 |
| PAL VIDEO | | 15.625 HIGH | 50 HIGH | 14.23 | 911 |
| SECAM VIDEO | | 15.625 HIGH | 50 HIGH | 14.23 | 911 |
| VGA 350 LINE | 640 × 350 | 31.47 HIGH | 70.1 LOW | 25.175 | 800 |
| VGA 400 LINE | 640 × 400 320 × 200 | 31.47 LOW | 70.1 HIGH | 25.178 | 800 |
| VGA 480 LINE | 640 × 480 | 31.47 LOW | 59.9 LOW | 25.175 | 800 |
| VGA TEXT | 720 × 400 | 31.46 LOW | 70.1 HIGH | 28.322 | 900 |
| VT-220 | 800 × 240 | 15.640 LOW | 59.9 LOW | 15.293 | 978 |
| VIDEO7 | 640 × 480 | 31.47 | | 24.245 | 772 |

Figure 7:
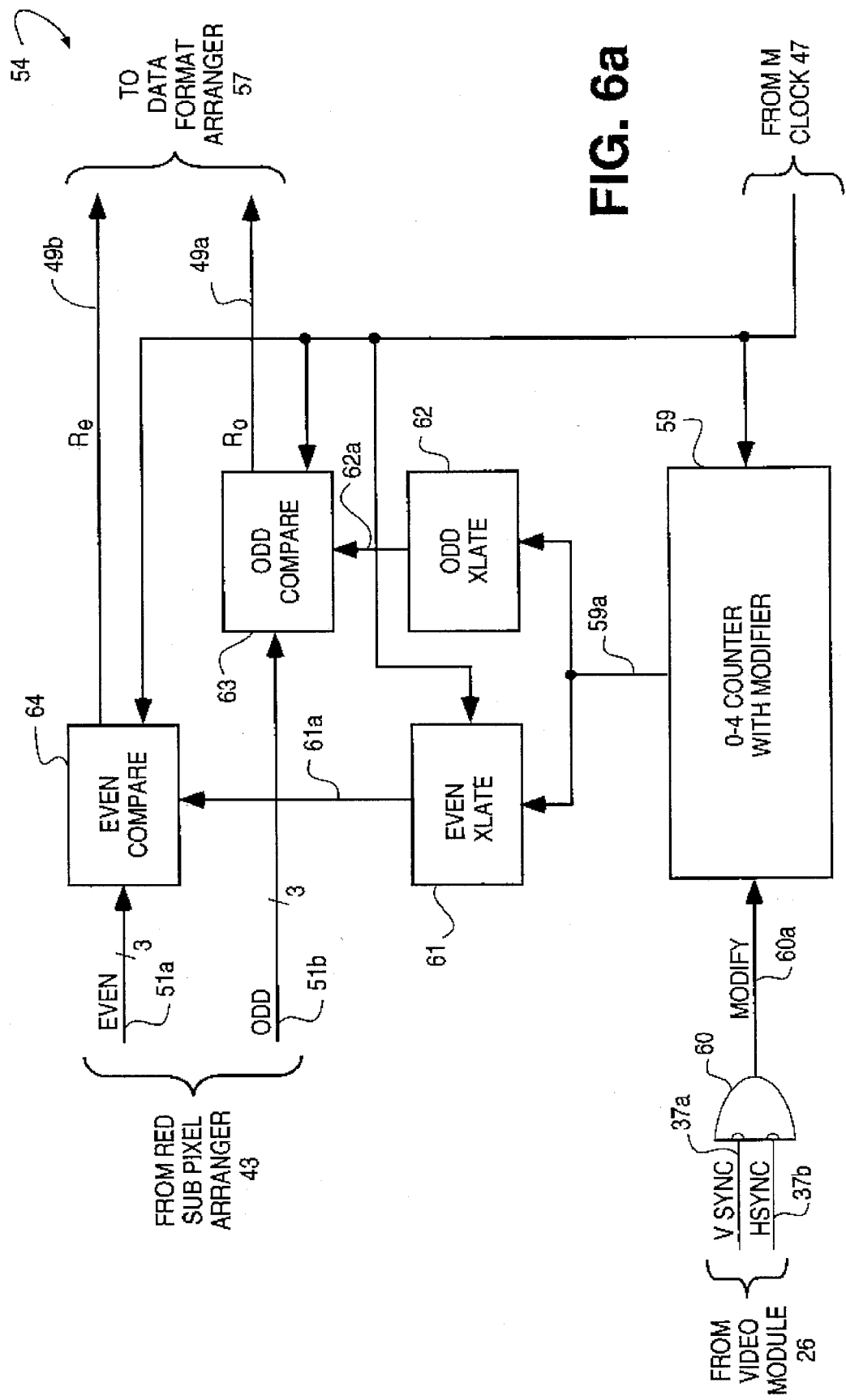
FIGS. 7A–E are symbolic representations of sub-pixel patterns mapped into a matrix array corresponding to the matrix array of the active matrix panel of FIG. 1.

Once the type of video module has been determined via the lookup table, the microprocessor 36 generates a digital signal which is supplied to the digital to analog converter 54a via an output conductor 24a. The digital signal supplied by the microprocessor 36 is indicative of an offset voltage to cause the output voltage from the amplifier 55a to be adjusted to a maximum of about 2.0 volts. As best seen in FIG. 7, the microprocessor 36 supplies similar offset signals to the other processing circuits 34 and 35 via a pair of conductors 24b and 24c respectively.

When the offset digital to analog converter 56a receives the digital signal from the microprocessor 36 it converts the digital signal to an analog voltage that is summed with the input raw video voltage, via a 1.65K resistor 56a connected between the positive input of amplifier 55a and the coupling resistor 27. The offset voltage affects the normalization of the input voltage prior to amplification by the operational amplifier 55a.

As best seen in FIG. 1, the interface unit 13 also includes an infrared receiver 38 having a receptor 39 for receiving infrared signals from a remote infrared transmitter unit (not shown). In this regard, a user may actuate the infrared transmitter unit for generating a signal to cause the microprocessor 36 to select a different video source by switching the multiplex unit 34. The infrared receiver 38 is a conventional infrared receiver unit whose output is coupled to the microprocessor 36 on a conductor 40.

D. LCD Controller

Considering now the LCD controller 12, in greater detail with reference to FIGS. 1 and 3, the LCD controller 14 generally comprises a sub-pixel modulator 49 for producing in response to each set of 5-bit digital signals received via the interface controller 13 a corresponding set of single-bit digital signals for driving the individual ones of the sub-pixel elements in a given pixel element in the active matrix panel 16. As will be explained hereinafter, the sub-pixel modulator 49 causes each one of the single-bit digital signals to be duty cycled at a sufficient rate to enable the active matrix panel 16 to display the full color images having in excess of 10,000 possible color combinations.

The LCD controller 14 also includes a set of three sub-pixel arrangers, a red sub-pixel arranger 43, a green sub-pixel arranger 44 and a blue sub-pixel arranger 45 that quantize the incoming 5-bit digital signals for each pixel element into 3-bit digital signals that are indicative of assigned gray scale values or codes. The sub-pixel arrangers 43–45 also cause the 3-bit digital signals to be temporarily stored, and then retrieved for display purposes, as well be explained hereinafter in greater detail, in predetermined sub-pixel arrangements that enable transitions between adjacent shading levels of the same primary color to be minimized so that contouring is eliminated or is at least reduced substantially. In this regard, the LCD controller 14 as best seen in FIG. 3, also includes a memory controller 46 for controlling the data going into and out of the sub-pixel arrangers 43–45, and a phase lock loop clock 50 that controls the data being stored by each individual sub-pixel arranger. A high speed master clock or mclock circuit 47 operates an mclock timing signal for controlling the retrieving of the temporarily stored the temporarily stored data in each of the individual sub-pixel arrangers 43–45. The mclock timing signal is coupled to each of the sub-pixel arrangers 43–45 as well as the sub-pixel modulator by a common conductor 48a.

As best seen in FIG. 3, the sub-pixel arrangers 43–45 are connected to the sub-pixel modulator 49 by a set of conductors 51a, 51b, 51c, 51d; and 51e, 51f respectively. In this regard, the data being retrieved from each sub-pixel arranger 43, 44 and 45 is arranged in an odd and even pair of 3-bits of color intensity codes.

In operation, the sub-pixel modulator 49 formats data retrieved form the arrangers 43–45 and drives the active matrix panel 16 in a high speed (120 hertz/frame) duty cycle modulation method. In this regard, the one bit drivers 17 in panel 16 are modulated at a rate of at least 120 hertz per frame to substantially prevent any noticeable flicker from occurring in the projected image.

The modulation speed of the active matrix panel 16 is established by the rate of the data flowing through the sub-pixel modulator 49 as established by the speed of the mclock timing signal. It should be understood, the modulation speed of the active matrix panel 16 is significantly different from the storage rate of the data being stored in each of the sub-pixel arrangers 43, 44 and 45, as established by the pixel clock. In this regard, the phase locked loop circuit 50 causes the HSYNC signal to be multiplied by a constant determined by the microprocessor 36 to establish the pixel clock rate.

D.1. Color Shade Arranger

Figures 7A, 7B, 7C, 7D, 7E:
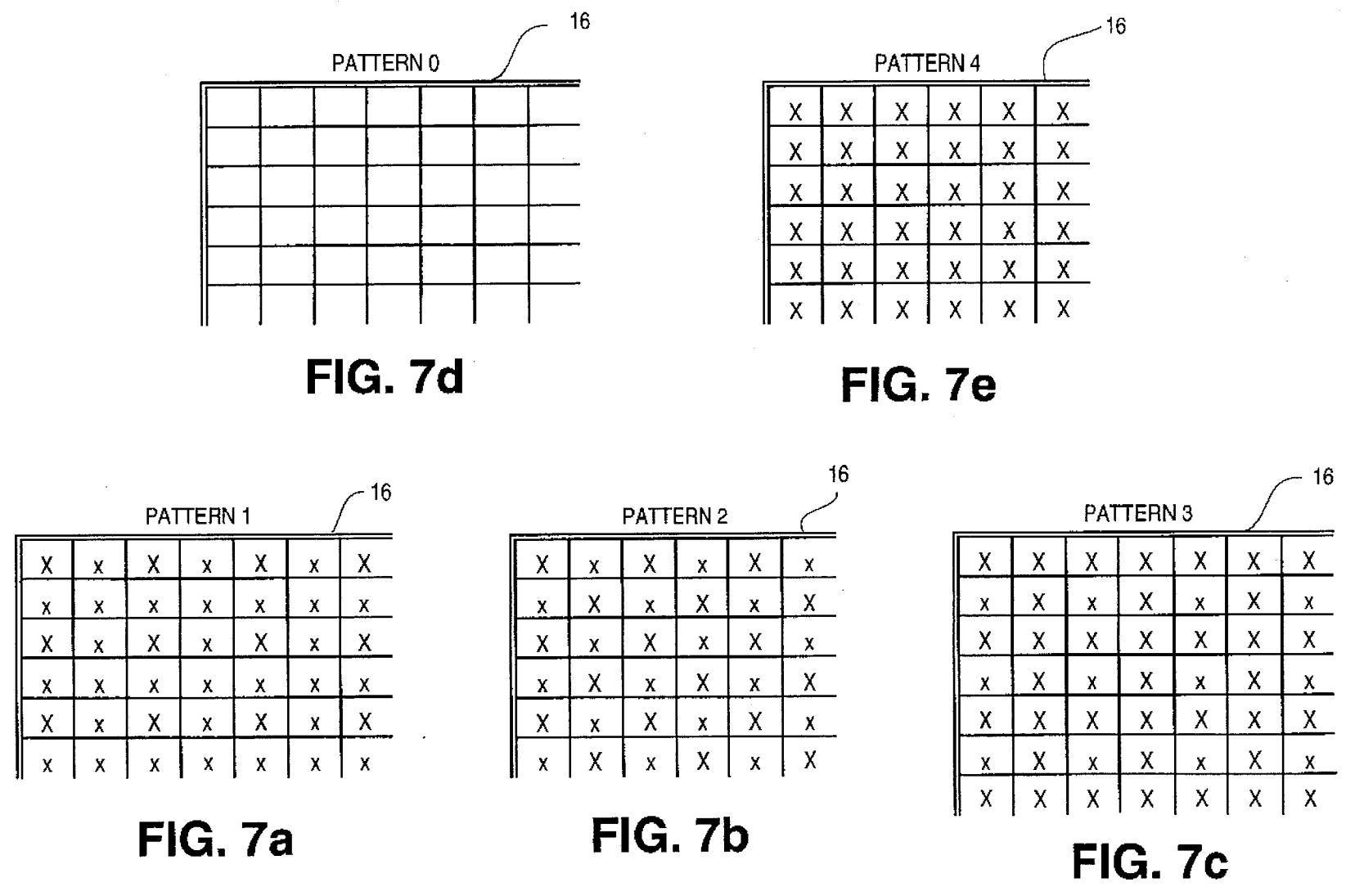

The purpose of the color shade arranger, whose construction details will be described below in greater detail, is to arrange the desired color intensities on the active matrix panel 16, in such a manner as to substantially increase the number of apparent color shades by using the ability of the human eye to average or integrate light intensities over an area larger than one pixel. This is achieved by arranging the desired color intensities of each primary color in various patterns numbered from zero to four, where pattern 0 has all sub-pixel elements of a single primary color turned off (FIG. 7D) and pattern 4 has all sub-pixel elements turned on (FIG. 7E). Patterns 1, 2 and 3 are shown in FIGS. 7A, 7B and 7C respectively where the "X"s on each of the FIGS. 7A–E are indicative of the same color intensities. It should also be understood with reference to the patterns where sub,pixel elements are energized to the same color intensity, the blank or void sub-pixel pattern squares are indicative of pixel elements which are energized to the next lower available intensity level.

Table II illustrates a pattern configured for a clearer understanding of sub-pixel intensity level configurations.

TABLE II

| INPUT LEVEL | PATTERN NUMBER | PANEL SUB-PIXEL ELEMENT DUTY CYCLE CODE NUMBERS | | | | | | | | | | |
|---|---|---|---|---|---|---|---|---|---|---|---|---|
| 17 | 1 (FIG. 7A) | 5 | 4 | 5 | 4 | 5 | 4 | 1 0 1 | 1 2 |
| 17 | 1 (FIG. 7A) | 4 | 4 | 4 | 4 | 4 | 4 | 0 0 0 | 2 1 |
| 17 | 1 (FIG. 7A) | 5 | 4 | 5 | 4 | 5 | 4 | 1 0 1 | 1 2 |
| 18 | 2 (FIG. 7B) | 5 | 4 | 5 | 4 | 5 | 4 | 0 0 0 | 2 1 |
| 18 | 2 (FIG. 7B) | 4 | 5 | 4 | 5 | 4 | 5 | 1 0 1 | 1 2 |
| 19 | 3 (FIG. 7C) | 5 | 5 | 5 | 5 | 5 | 5 | 0 0 0 | 2 1 |
| 19 | 3 (FIG. 7C) | 4 | 5 | 4 | 5 | 4 | 5 | 1 0 1 | 1 2 |
| 19 | 3 (FIG. 7C) | 5 | 5 | 5 | 5 | 5 | 5 | 0 0 0 | 2 1 |
| 19 | 3 (FIG. 7C) | 4 | 5 | 4 | 5 | 4 | 5 | 1 0 1 | 1 2 |
| 20 | 4 (FIG. 7E) | 5 | 5 | 5 | 5 | 5 | 5 | 0 0 0 | 2 1 |
| 20 | 4 (FIG. 7E) | 5 | 5 | 5 | 5 | 5 | 5 | 1 0 1 | 1 2 |
| 20 | 4 (FIG. 7E) | 5 | 5 | 5 | 5 | 5 | 5 | 0 0 0 | 2 1 |
| 1 | 1 (FIG. 7A) | 1 | 0 | 1 | 0 | 1 | 0 | 1 0 1 | 1 2 |
| 1 | 1 (FIG. 7A) | 0 | 0 | 0 | 0 | 0 | 0 | 0 0 0 | 2 1 |
| 2 | 2 (FIG. 7B) | 2 | 1 | 2 | 1 | 2 | 1 | 2 1 2 | 1 2 |
| 2 | 2 (FIG. 7B) | 1 | 2 | 1 | 2 | 1 | 2 | 1 2 1 | 2 1 |

The above Table II describes an illustrative example in the right hand column thereof, of the duty cycle intensity levels for an array of panel sub-pixel elements. It should be understood that the sub-pixel element array described in Table II would only constitute a small portion of a conventional LCD panel, since it would typically comprise a much larger number of such elements.

The left hand column lists a set of input intensity levels of a gradation between an intermediate input level 17 through a more intense input level 20. The corresponding output gray scale levels are listed in the right hand column.

The middle column lists the corresponding pattern configuration for each one of the input levels as best seen in FIG. 7A–C and E.

The remaining portion of the pixel elements are shown in Table II at much lower intensity input levels of 1 and 2. Thus, by reviewing the example of Table II, it will become apparent to those skilled in the art that a finely textured shading of an image can be achieved. In this regard, as shown in Table II, the input intensity shading levels of 17 through 20, change slightly from one sub-pixel element to the next, to achieve a high resolution image, with a blended gradation of color shading levels, in any desired manner.

By such a subtle gradation of color shadings between the input shading level 17 and input shading level 20, not only is contouring substantially eliminated, but also, a large number of different color shades are produced for each primary color.

A graphical representation of such a large number of different color shading levels is illustrated in FIG. 11. In this regard, by employing four different patterns of intensity levels between the principle duty cycle levels, such as the duty cycle levels 4 and 5 of FIG. 11 for example, different color shades are produced. In this manner, even though there are only a total of eight (0–7) possible duty cycle levels employed, in any one quadrant group as shown in the Truth Table of Table III, a total of two different duty cycle levels are employed in many individual ones of the input levels. Thus, there are a total of sixteen possible duty cycle intensity levels for a given sub-pixel element. It will be understood that many of these are redundant, and therefore there are a fewer number of useful duty cycle intensity levels for each sub-pixel element. However, since there are intermediate intensity levels achieved, as shown in FIG. 11, by the use of the various different patterns, there are in fact four times as many intensity levels achieved.

In an actual embodiment of the invention as constructed in use, there are a total number of actual true colors in excess of ten thousand such colors, when combining the three primary colors using the technique of the present invention. Thus, it will become apparent to those skilled in the art that a very large number of true colors are achieved, and a very high resolution, finely textured shading gradation for each color is achieved by means of the method and the system of the present invention. All of this is accomplished, by using only a single bit of information for driving each sub-pixel element.

As best seen in the Table III, each group of quadrant locations employ only two different duty cycle intensity levels. Also, there is only one change in the duty cycle intensity level from one group of quadrant locations to the next group of quadrant locations. Thus, a finely textured gradation of color shading is achieved by such a technique of patterning.

The duty cycle intensity levels are chosen for any given group of quadrant locations, such that the two duty cycle intensity levels are a high intensity level and a lower intensity level which is equal to the higher intensity level less one. For example, in the input level six, the duty cycle level for that quadrant group has a duty cycle level two and a lower duty cycle intensity level which is one less than that—e.g. one. In this manner, a very fine gradation of shading occurs between the different input levels.

Figure 13:
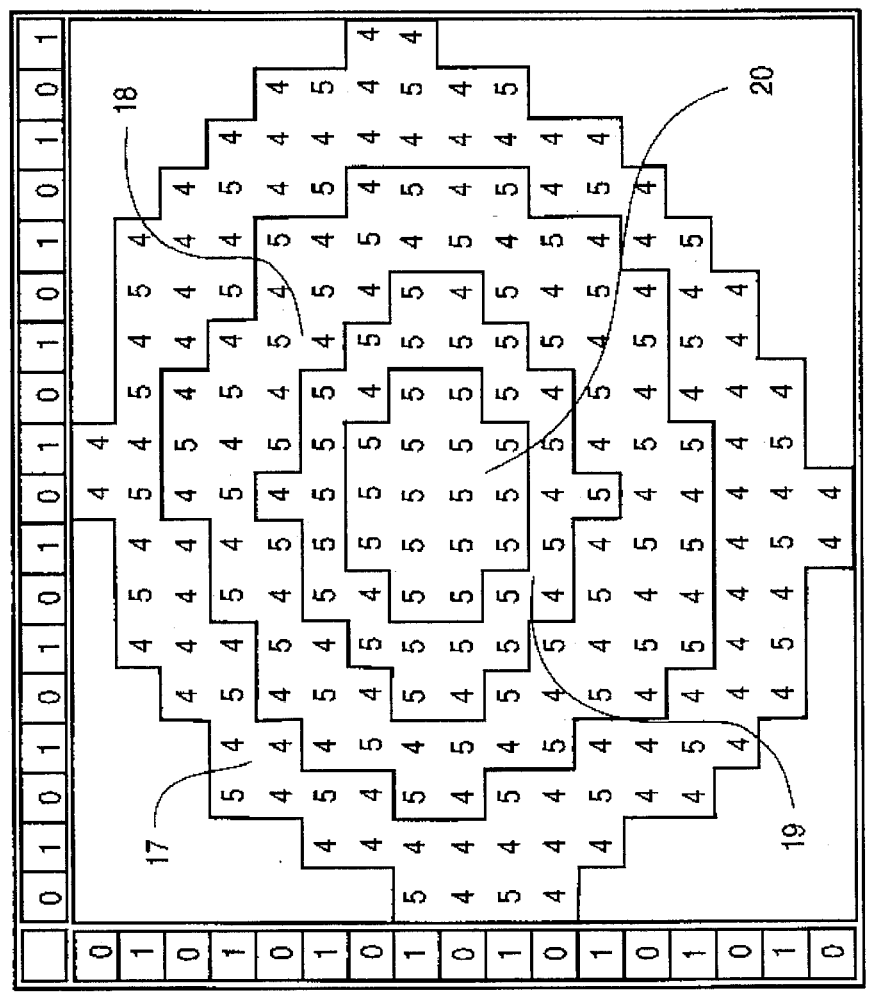
FIG. 13 is a symbolic representation energized sub-pixel elements energized to form a concentric circle image on an active matrix panel of FIG. 1.

Referring now to FIG. 13, there is illustrated another example of an array of panel sub-pixel elements activated at different duty cycle intensity levels in accordance with the present invention, and in a manner to the example described in Table II. The example of FIG. 13 shows concentrically arranged images. The central image is the most intense at an input intensity level 20 (a pattern 4 with all elements activated, at a duty cycle code number 5). The next successive concentrically disposed image area is at an input intensity level 19 (one less than the central most image area). In a similar manner, each successive outer image area has a different input intensity level (one less than its contiguous inner image area).

Thus, in accordance with the present invention, a fine gradation of color shading of a single color is achieved. Also, the illustration in FIG. 13, shows that the system and method of the present invention enables the color shading gradations are achieved in a precise manner to provide a high resolution resulting image perceived by the viewer. The image of FIG. 13 is one of a generally concentric circular arrangement, which could not be otherwise readily achieved with such high resolution by using conventional composite pixel configurations, such as a 2 by 2 pixel configurations.

D.1.1 Detailed Description of Color Shade Arranger

Considering now the sub-pixel arranger units 43, 44 and 45 with reference to FIG. 3, only the red sub-pixel arranger unit 43 will be described hereinafter as each of the arranger units 43, 44 and 45 are substantially similar to each other.

Figure 4:
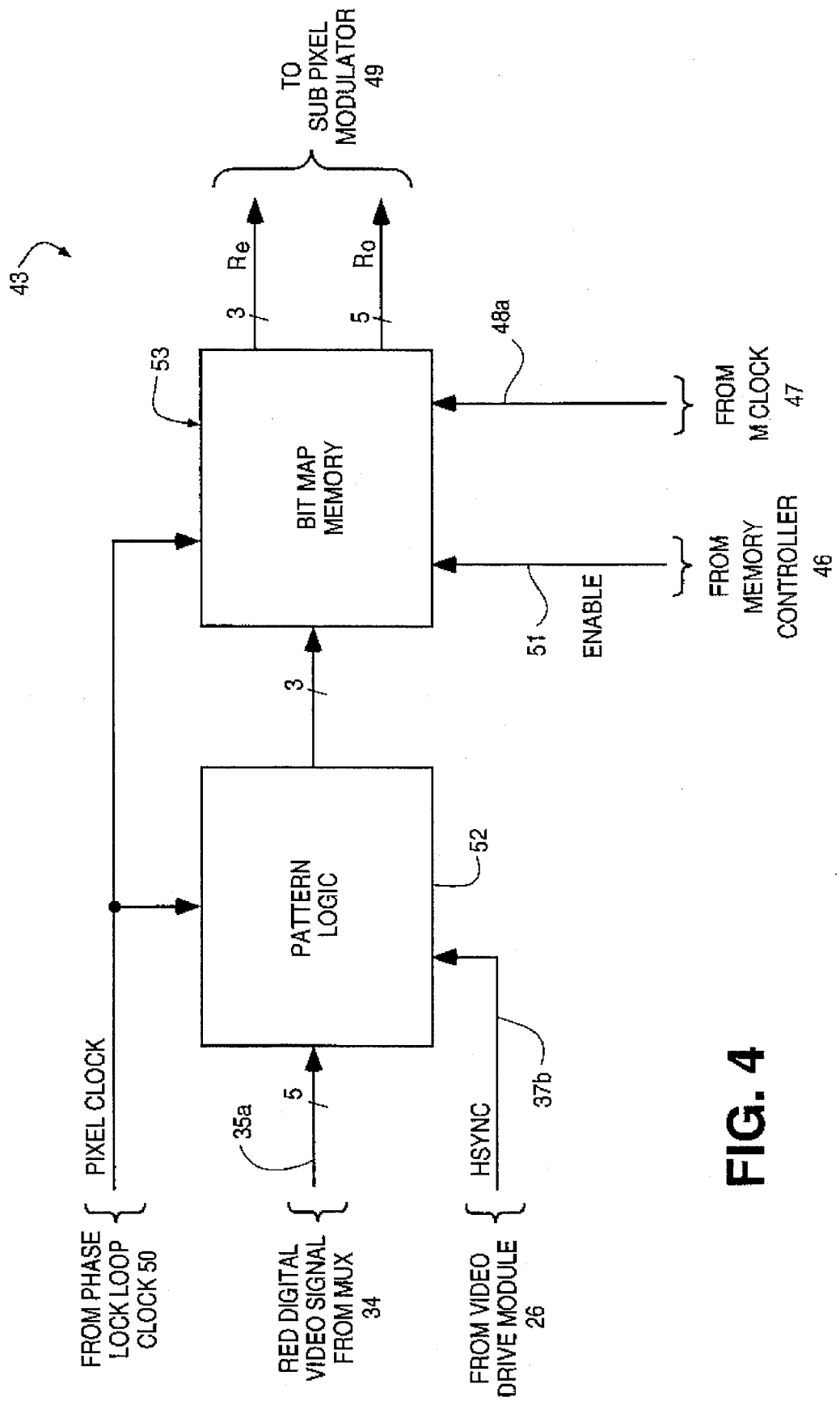
FIG. 4 is a block diagram of a red sub-pixel arranger of FIG. 3.
Figure 5:
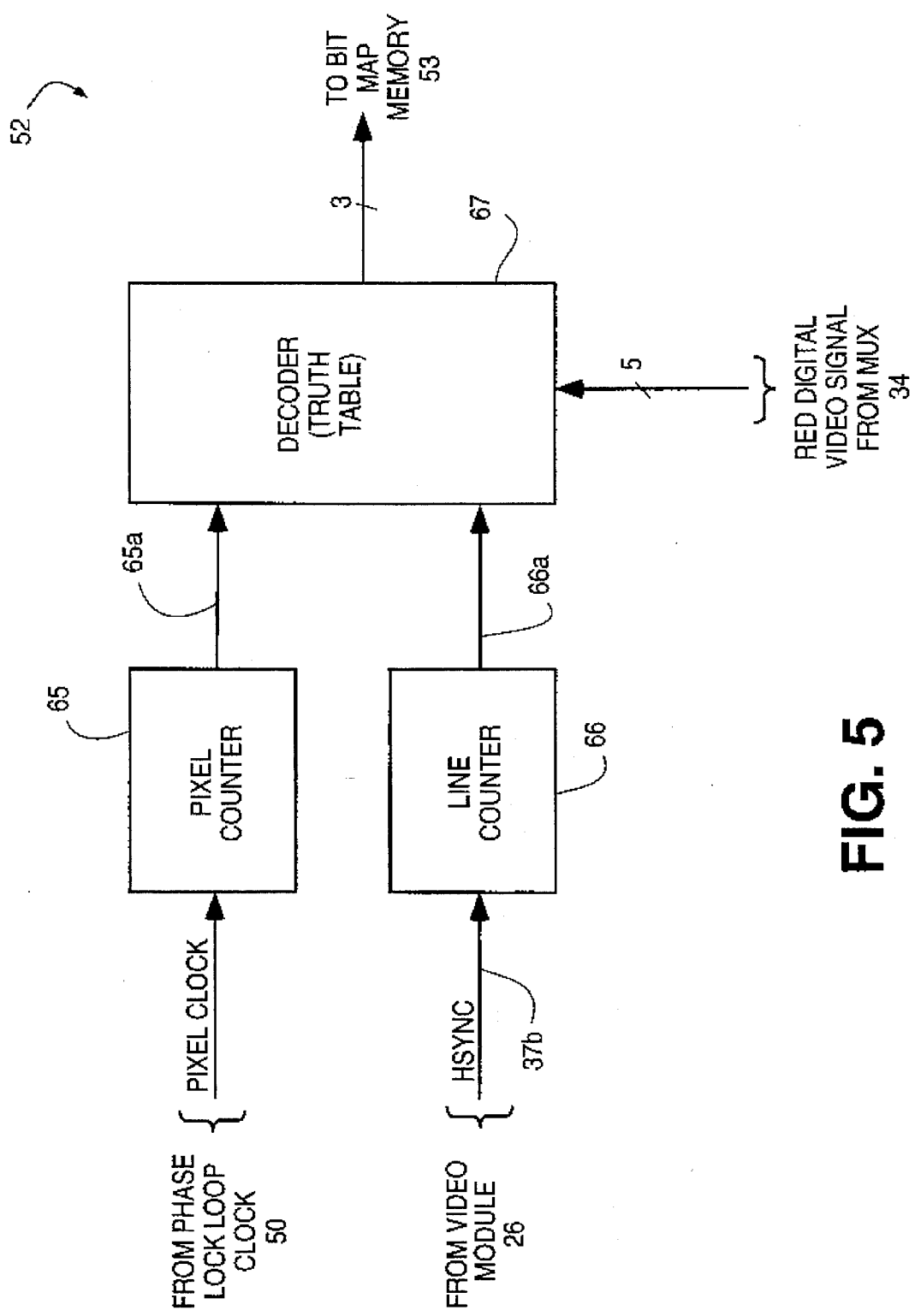
FIG. 5 is a block diagram of the pattern logic unit of FIG. 4.

As best seen in FIGS. 4 and 5, the sub-pixel arranger unit 43 generally comprises a pattern logic unit 52 for processing all of the 5-bit input signals for the red sub-pixels into one of 5 sub-pixel pattern configurations of 3-bit signals indicative of color codes. The sub-pixel arranger 43 also includes a bit map memory 53 for storing temporarily the color coded signals in the various sub-pixel pattern arrangements as previously described. The storage of data into the bit map memory 53 is controlled by the memory controller 46 via the timing signals produced by the mclock circuit 47.

The pattern logic 52 converts each 5-bits of incoming data which is indicative of 32 shades of a single primary color, into one of a maximum of 8 gray scale color codes representing 8 desired color shading levels, which are assigned to individual ones of the sub-pixel elements. The resulting color code for each 5-bit input color information is determined by a sub-pixel arranger truth table as will be described hereinafter.

The arrangement of patterns was determined experimentally to arrive at the best arrangements for displaying the subtle color variations contained in the 32 different shades of each primary color. The patterns thus enable gradations between different intensity levels to be blended in a high resolution manner on a sub-pixel element by sub-pixel element basis.

The patterns when processed together with the asynchronous modulation of the 3-bit color code in the sub-pixel modulator 49, represent various different color shades by constantly changing subtle patterns that the human eye averages as slight changes in color intensity or shading. This effect is further strengthened by the operation of the sub-pixel modulator 49 where the 3-bit color codes are interpreted differently, pseudo-randomly, on a pixel by pixel basis, line to line, and frame to frame; such that the human eye is unable to discern the different pattern arrangements.

It should be understood, that theoretically there are combinations of arrangement patterns and pixel modulations, that produce 32 shading levels for each primary color of red, green and blue, to provide a total number of 32 to third power possible levels. However, there are many redundant conditions, since different pattern combinations result in similar shades within the perceived image. Thus in an actual working model of the invented system, because of the redundancies and similarities, only about 21 to 25 shades can actually be perceived for each of the primary colors by the average person. Therefore, the total number of colors that can be seen ranges between about 10,000 to 20,000 different color combinations, with the exact number being determined by the electro-optical characteristics of the particular active matrix panel in use.

D.1.2 Pattern Logic

Figure 9:
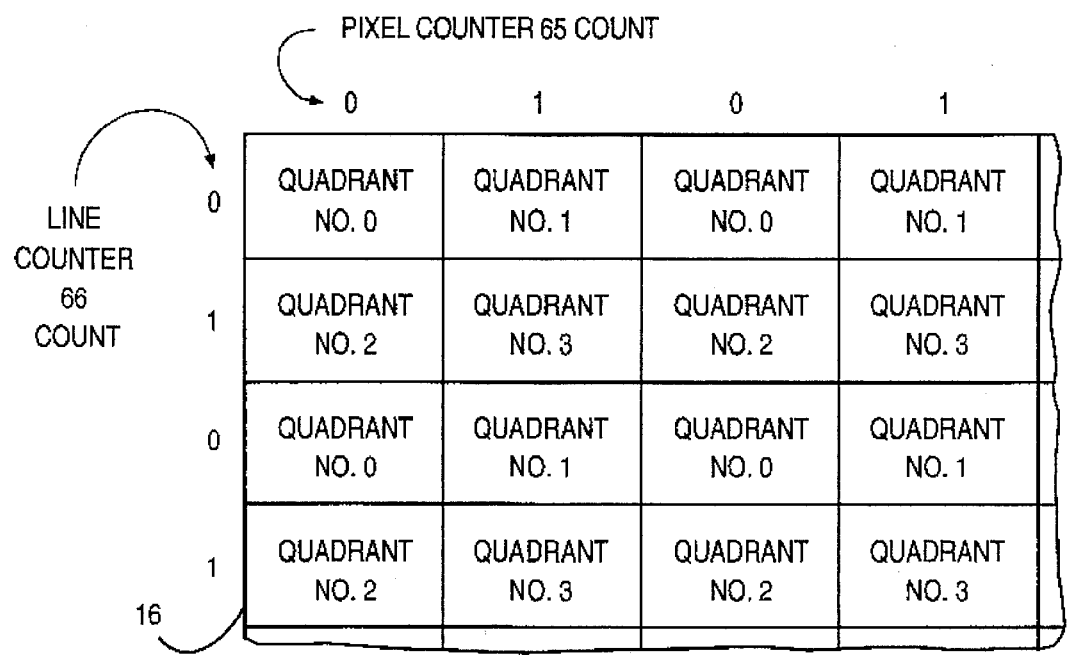
FIG. 9 is a symbolic representation of the 2×2 pixel array produced by the pattern logic decoder of FIG. 5.

Considering now, the pattern logic 52, in greater detail with reference to FIGS. 5 and 9, the pattern logic 52 generally comprises a one bit pixel counter 65, a one bit line counter 66, and a decoder unit 67 that implements the logic as illustrated by Table III. The pixel counter 65, counts between zero and one in synchronization to the pixel clock signal received from the phase locked loop circuit 50. The line counter 66, counts between zero and one in synchronization to the HSYNC signal received from the video module 26 on conductor 37a. The decoder 67 decodes the counter outputs together with the 5-bit color shading level information received from analog to digital converter 56a to determine what color code should be assigned to each sub-pixel element for the red sub-pixels. The results of the pixel counter 65 and the line counter 66 are used to determine where the sub-pixel element color information will be located on the active matrix 16 viewing screen, in relation to the other sub-pixel elements pixels on the screen.

FIG. 9 illustrates how the pixel and line counter data is utilized to determine which one of 4 possible pixel quadrant positions is being processed. The pixel processing position is indicated by one of four quadrant locations 0, 1, 2 or 3 in the matrix array of the panel 16. The logic implemented by the decoder 67, as shown in Table III utilizes the two counter inputs to determine the pixel quadrant location number 0, 1, 2 or 3, and the 5-bits of color information to determine the color code for any sub-pixel element within the active matrix panel 16.

FIGS. 7A–E illustrates how the different color shades of one primary color are mapped into the entire viewing area of the active matrix panel 16. The "X" on FIGS. 7A–C and E represent one arbitrary 3 bit color code as it is used by the sub-pixel modulator 49. The quadrant locations on FIGS. 7A–C and E with "x" represent another arbitrary 3 bit color code that is one less than the color code represented by the "X." These spread out patterns coupled with the underlying pseudo-randomness of the sub-pixel modulation results in the ability of displaying many thousands of shades of primary colors, on a low cost active matrix panel with only one bit drivers, in a flicker free fashion that is pleasing to the viewer.

From the foregoing, it should be understood that the various sub-pixel patterns as illustrated in FIGS. 7A–E are not created on a composite pixel basis but rather are created on a sub-pixel by sub-pixel basis to achieve a display image having very high color resolution without the loss of any substantial color information.

Those skilled in the art will understand the present invention is not limited to the use of one bit counters for the line and pixel counters units 65 and 66. Any number of bit counters may be used as long the resolution of the panel 16 together with the patterns produced by the resulting location codes do not substantially produce any noticeable lines or patterns on the resulting image.

D.1.3 Pattern Logic Equations and Truth Table

Considering now, in more detail the pattern logic, with respect to the FIGS. 5, 7A–E, 9 and 11, the decoder 67 contains a truth table that completely describes the mapping from the 5-bit color video information to the 3-bit color code used by the sub-pixel modulator 49. The truth table shown in Table III, contains 2 inputs and one output; where two inputs consist of the 5-bit color video information, a desired color input level from 0 to 31, and a sub-pixel location in the active matrix panel, a quadrant number from 0 to 3, as shown in FIG. 9. FIG. 9 completely describes the array of sub-pixel location information, where depending upon the state of the pixel counter 65, and the line counter 66, a number between 0 and 3 is assigned; this number is a quadrant location relative to the panel sub-pixel matrix array and is only used to determine the color code to be assigned to any particular sub-pixel element. In this regard, the sub-pixels in the array are logical address elements and are assigned color codes according to the truth table logic. With this method, there is no loss of resolution as would occur in a system that actually used pixels as a whole entity.

TABLE III

Truth Table for Pattern Logic

| INPUT LEVEL | QUADRANT LOCATION | DUTY CYCLE LEVEL |
|---|---|---|
| 0 | 0 | 0 |
| 0 | 1 | 0 |
| 0 | 2 | 0 |
| 0 | 3 | 0 |
| 1 | 0 | 0 |
| 1 | 1 | 1 |
| 1 | 2 | 0 |
| 1 | 3 | 0 |
| 2 | 0 | 0 |
| 2 | 1 | 1 |
| 2 | 2 | 0 |
| 2 | 3 | 1 |
| 3 | 0 | 1 |
| 3 | 1 | 1 |
| 3 | 2 | 0 |
| 3 | 3 | 1 |
| 4 | 0 | 1 |
| 4 | 1 | 1 |
| 4 | 2 | 1 |
| 4 | 3 | 1 |
| 5 | 0 | 1 |
| 5 | 1 | 2 |
| 5 | 2 | 1 |
| 5 | 3 | 1 |
| 6 | 0 | 1 |
| 6 | 1 | 2 |
| 6 | 2 | 1 |
| 6 | 3 | 2 |
| 7 | 0 | 2 |
| 7 | 1 | 2 |
| 7 | 2 | 1 |
| 7 | 3 | 2 |
| 8 | 0 | 2 |
| 8 | 1 | 2 |
| 8 | 2 | 2 |
| 8 | 3 | 2 |
| 9 | 0 | 2 |
| 9 | 1 | 3 |
| 9 | 2 | 2 |
| 9 | 3 | 2 |
| 10 | 0 | 3 |
| 10 | 1 | 2 |
| 10 | 2 | 2 |
| 10 | 3 | 3 |
| 11 | 0 | 3 |
| 11 | 1 | 3 |
| 11 | 2 | 2 |
| 11 | 3 | 3 |
| 12 | 0 | 3 |
| 12 | 1 | 3 |
| 12 | 2 | 3 |
| 12 | 3 | 3 |
| 13 | 0 | 3 |
| 13 | 1 | 4 |
| 13 | 2 | 3 |
| 13 | 3 | 3 |
| 14 | 0 | 3 |
| 14 | 1 | 4 |
| 14 | 2 | 3 |

TABLE III-continued

Truth Table for Pattern Logic

| INPUT LEVEL | QUADRANT LOCATION | DUTY CYCLE LEVEL |
|---|---|---|
| 14 | 3 | 4 |
| 15 | 0 | 4 |
| 15 | 1 | 4 |
| 15 | 2 | 3 |
| 15 | 3 | 4 |
| 16 | 0 | 4 |
| 16 | 1 | 4 |
| 16 | 2 | 4 |
| 16 | 3 | 4 |
| 17 | 0 | 4 |
| 17 | 1 | 5 |
| 17 | 2 | 4 |
| 17 | 3 | 4 |
| 18 | 0 | 4 |
| 18 | 1 | 5 |
| 18 | 2 | 4 |
| 18 | 3 | 5 |
| 19 | 0 | 5 |
| 19 | 1 | 5 |
| 19 | 2 | 4 |
| 19 | 3 | 5 |
| 20 | 0 | 5 |
| 20 | 1 | 5 |
| 20 | 2 | 5 |
| 20 | 3 | 5 |
| 21 | 0 | 5 |
| 21 | 1 | 6 |
| 21 | 2 | 5 |
| 21 | 3 | 5 |
| 22 | 0 | 5 |
| 22 | 1 | 6 |
| 22 | 2 | 5 |
| 22 | 3 | 6 |
| 23 | 0 | 6 |
| 23 | 1 | 6 |
| 23 | 2 | 5 |
| 23 | 3 | 6 |
| 24 | 0 | 6 |
| 24 | 1 | 6 |
| 24 | 2 | 6 |
| 24 | 3 | 6 |
| 25 | 0 | 6 |
| 25 | 1 | 7 |
| 25 | 2 | 6 |
| 25 | 3 | 6 |
| 26 | 0 | 6 |
| 26 | 1 | 7 |
| 26 | 2 | 6 |
| 26 | 3 | 7 |
| 27 | 0 | 7 |
| 27 | 1 | 7 |
| 27 | 2 | 6 |
| 27 | 3 | 7 |
| 28 | 0 | 7 |
| 28 | 1 | 7 |
| 28 | 2 | 7 |
| 28 | 3 | 7 |
| 29 | 0 | 7 |
| 29 | 1 | 7 |
| 29 | 2 | 7 |
| 29 | 3 | 7 |
| 30 | 0 | 7 |
| 30 | 1 | 7 |
| 30 | 2 | 7 |
| 30 | 3 | 7 |
| 31 | 0 | 7 |
| 31 | 1 | 7 |
| 31 | 2 | 7 |
| 31 | 3 | 7 |

D.1.4 Bit Map Memory Controller

Considering now the memory controller 46 in more detail with reference to FIGS. 4 and 5, the memory controller 46 controls the storing and retrieving of the color code information from each of the sub-pixel arranger 43, 44 and 45. In this regard, the memory controller 46 is more fully described in copending U.S. patent application Ser. No. 07/586,506 and will not be described hereafter in greater detail.

D.2. Sub-Pixel Modulator

The sub-pixel modulator 49, causes individual sub-pixel elements, such as sub-pixel elements 101A, 101B and 101C to turn on and off at a very rapid rate so that the human eye averages the on and off bursts of color images into a single sub-pixel image having a distinct shade of color. In this regard, the sub-pixel modulator 49 causes the bursts of color images to go on and off at such a rapid rate that the on and off sequences are not discernable to the viewer as flicker.

D.2.1 Detailed Description of the Sub-Pixel Modulator

Considering now the sub-pixel modulator 49 in greater detail, with reference to FIGS. 3, 6, 12 and 12A–C, the sub-pixel modulator 49 generally includes a set of odd/even logic units (FIG. 6), a red odd/even logic unit 54, a green odd/even logic unit 55 and a blue odd/even logic unit 56 for processing red, green, and blue sub-pixel color code information respectively. The sub-pixel modulator 49 also includes a panel state device 58 and a data format arranger 57 that cause the individual single-bits of color information to be assembled into two 8-bit groups of data which are transferred to the active matrix panel line drivers. As each of the odd/even logic units 54–56 are substantially similar only the red odd-even logic unit 54 will be described in greater detail.

The red odd-even logic unit 54 processes the 3-bit color code information received from the red sub-pixel arranger 43 via a pair of conductors 51a and 51b. After processing the information, the logic unit 54 sends the results to the data format arranger 57, which groups the single bits of processed data into a suitable form for driving the single-bit line drivers in the active matrix panel 16. The panel state device 58 controls the data format process and generates the panel synchronization signals PHSYNC and PVSYNC which are also sent to the active matrix panel 16.

Since the active matrix panel 16 has only one-bit LCD drivers 17, only one bit of information can be passed to any sub-pixel element at any time. This one bit of data is either a 1 or a zero for on or off. Data received from the sub-pixel arranger 43 is retrieved in two 3-bit groups from an odd numbered memory location address and from an even numbered memory location address respectively. The retrieved data contains the color codes information required for pairs of corresponding sub-pixel elements in the active matrix panel 16. Each 3-bits of color code information is utilized to create up to 8 shades of color, by a duty cycle technique that causes the 3-bits of data to be quantized into a single bit digital signal that is turned on and off at a frequency much higher than the input computer video signal frequency shown in the horizontal and vertical synchronization signals received from the video module 26. This modulation of rapidly turning the signal on and off over a large number of frame time intervals results in a sub-pixel image having an averaged intensity that approximates the desired color intensity assigned by the color code. For example, if a code of 3 is desired out of 6 pixel codes then when the sub-pixel is turned on an average of one half of the frame times, or 3 out of 6 frames, a half intensity will result. The duty cycle technique depends greatly upon being able to turn the sub-pixel on and off without the viewer seeing any flicker or moving patterns on the image. The invention described herein does not exhibit substantially any noticeable flicker because the result of the high speed frame timing provided by the panel state device 58 and because the odd-even logic units 54, 55 and 56, prevent duty cycle flicker by changing the color code comparison value for each sub-pixel element constantly on a line by line and a frame by frame basis.

Those skilled in the art can see that this invention is not limited to use of 3-bit color codes. Depending upon the electro-optical characteristics of the active matrix panel 16, any number of bits may be used as long as discernable color shades can be formed which do not produce any substantially noticeable flicker.

Figure 6:
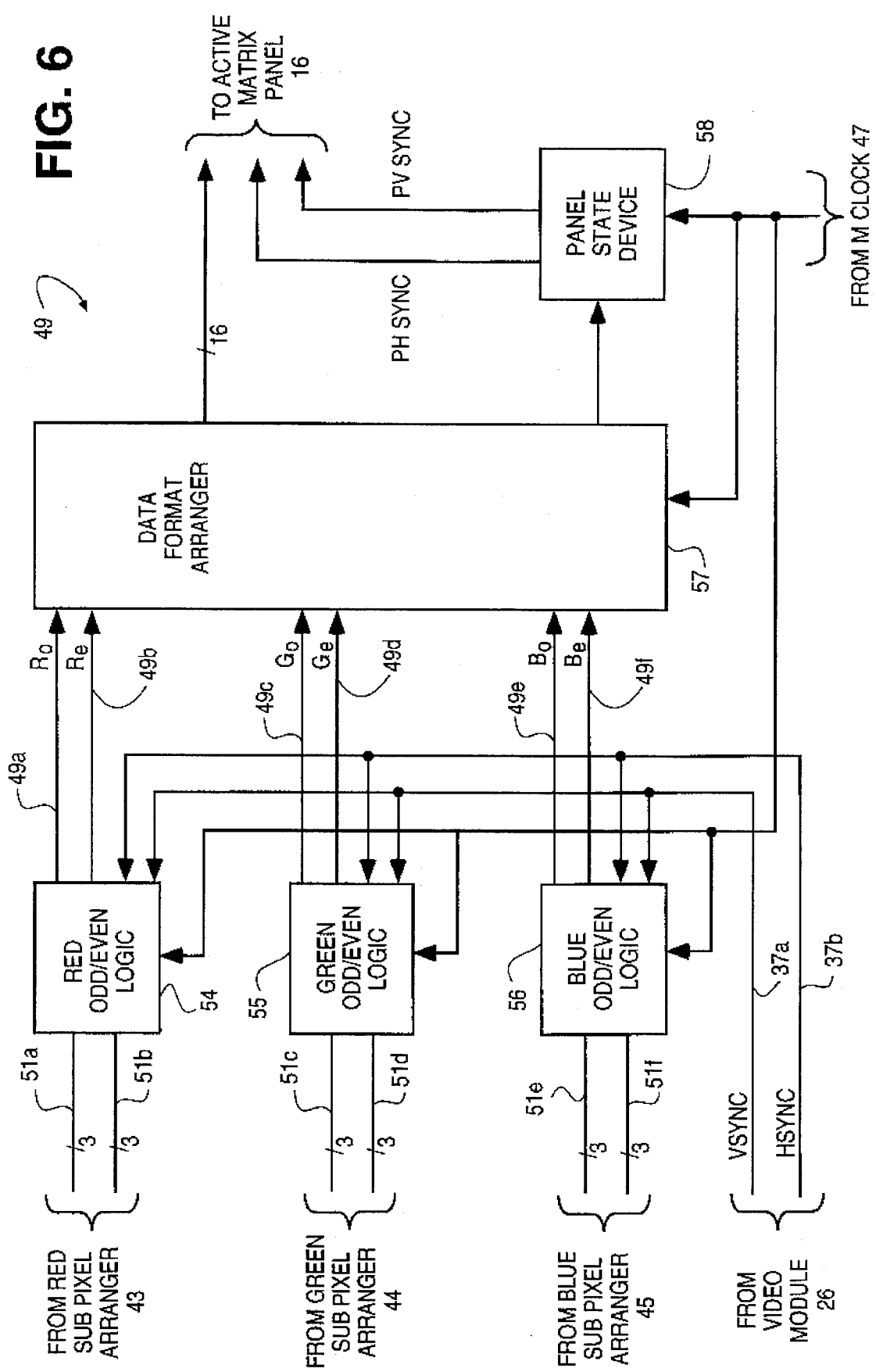
FIG. 6 is a block diagram of the sub-pixel modulator of FIG. 3.

Considering now the red odd/even logic unit 54 in greater detail with reference to FIGS. 6 and 6A, the logic unit 64 generally includes a pair of comparators, an odd comparator 63 and an even comparator 64 for quantizing 3-bits of odd and 3-bits of even color code information retrieved from the red sub-pixel arranger 43. The odd and even designations refer to odd and even memory addressed within the bit-map memory 53. In this regard, it should be understood the data retrieved from the bit map memory 53 is retrieved in two 3-bit groups to enable the data to be processed at a sufficient rate to drive the active matrix panel 16.

The red odd/even logic unit 54 also includes a pair of translator units, an even translator 61 and an odd translator 62 that supply one of two comparison signals to the even comparator 64 and the odd comparator 63 respectively. The even translator 61 and the odd translator 62 are connected to the even comparator 64 and the odd comparator 63 by a pair of conductors 61a and 62a respectively.

The red odd/even logic unit also includes a counter arrangement shown generally at 70 that includes a counter 59 and a modifier gate 60.

The odd translator 61 and the even translator 62 cause the comparison signals supplied on conductors 61a and 62a to be varied so that sequential sub-pixel elements will not be energized via the same comparison values.

D.2.2 Sequential Counter with Modifier

The odd unit 62 and the even unit 61 assure that sequential sub-pixel elements will not be energized in a repetitive pattern from line to line and from frame to frame. In this regard, line to line and frame to frame pseudo-randomness is achieved by the modified gate 60 and the counter 59. More particularly, when the VSYNC signal is low and the HSYNC signal is high gate 60 generates a modify pulse. The modify pulse is coupled to the counter 59 via a conductor 60a. The modify pulse is generated whenever a new line of video information is to be displayed, but not on the first new line of each new frame.

When counter 69 receives the modify signal, the counter is incremented by a count of 2, instead of a count of one. This line by line counter modification insures that from frame to frame the comparison value utilized for every sub-pixel element will be different.

D.2.3 ROM translate for Odd and Even

The color code comparison values for the odd comparator 63 and the even comparator 64 are generated by the counter 59, in FIG. 6a. Counter 69 is synchronized to the high speed mclock signal counts in a sequence of 0, 1, 2, 3, 4 repeatedly. The individual counter values are sent via a conductor 59a to the even unit 61, and to the odd unit 62. The even and odd units 61 and 62 cause the count values to be translated for use by the even comparator unit 64 and the odd comparator unit 63. The values are translated via logic that implements the translation truth table shown in Table IV.

Those skilled in the art will understand that larger and smaller count values can be used to achieve desired results. In this regard, any counter that produces values that equal the values of the color codes produced by the arrangers 43–45 can be used with this method. To substantially eliminate any extraneous beat patterns or flicker resulting from the duty cycle modulation, a periodic modification of the counter sequence must be performed. In one embodiment of the present invention, a count sequence of 0, 1, 2, 3, 4 is used. This count of 5 numbers is evenly divisible into the standard VGA line length of 800 pixel clocks. Therefore, the count 69, of 5 numbers must be periodically modified by the modify gate 60, so that no extraneous beat patterns are produced. If another number of counts is used, for example 0, 1, 2, 3, 4, 5, 6 (called a count of 7 numbers) which is not evenly divisible into the standard VGA line length of 800 pixel clocks then it may not necessarily be required to periodically modify the count sequence as long as the count sequence is allowed to "free run" during horizontal retrace so that each line uses a different count sequence, pixel to pixel. However, in certain situations, modification may be desirable to improve overall image quality.

TABLE IV

Odd Even Translation Table

| Counter | Odd Value | Even Value |
|---------|-----------|------------|
| 0 | 0 | 1 |
| 1 | 2 | 3 |
| 2 | 4 | 0 |
| 3 | 1 | 2 |
| 4 | 3 | 4 |

D.2.4 Greater than Comparison

The even comparator unit 64 and the odd comparator unit 63, compare the color code values received from the red sub-pixel arranger with the comparison values from the even and odd translators 61 and 62 respectively. Whenever the color code received from the arranger 43 is greater than the comparison value produced by the translators, a logic one will be passed to the data format arrangement on conductors 49a and 49b.

Those skilled in the art can see that a less than comparison or an at least equal to comparison could also be used, with the proper signal conditioning circuits, to replace the greater than comparison.

E. Panel Data Formatter

Considering now the data formatter 57 in more detail, with reference to FIG. 6a, the data format arranger 57 in cooperation with the panel state device 58, controls the formatting of data for the active matrix panel 16 and more particularly its associated one-bit drivers. In this regard, the data format arranger 57 is more fully described in copending U.S. patent application Ser. No. 07/586,506 and will not be described hereinafter in more detail.

Figure 14:
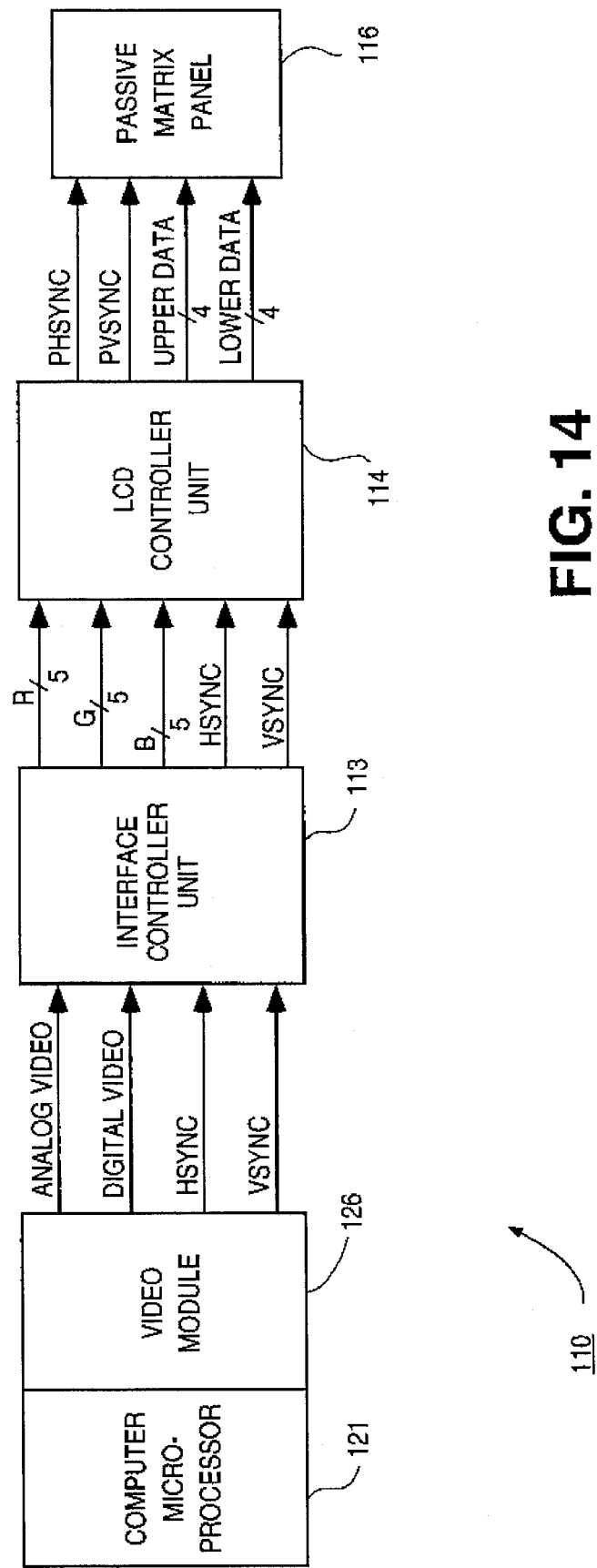
FIG. 14 is a block diagram of another high color resolution system constructed in accordance with the present invention, and which is illustrated being coupled between a video signal producing device and a passive matrix display panel.

Referring now to the drawings, and more particularly to FIG. 14 thereof, there is shown another high resolution display system 110 which is also constructed in accordance to the present invention. The high resolution display system 110 is illustrated coupled between a passive matrix panel 116 and a video generating source, such as a VGA video drive module 126 driven by a personal computer 121.

The high resolution display system 110 generally comprises an interface controller unit 113 and an LCD controller unit 114. The interface unit 113 is substantially similar to interface controller unit 13.

Figure 15:
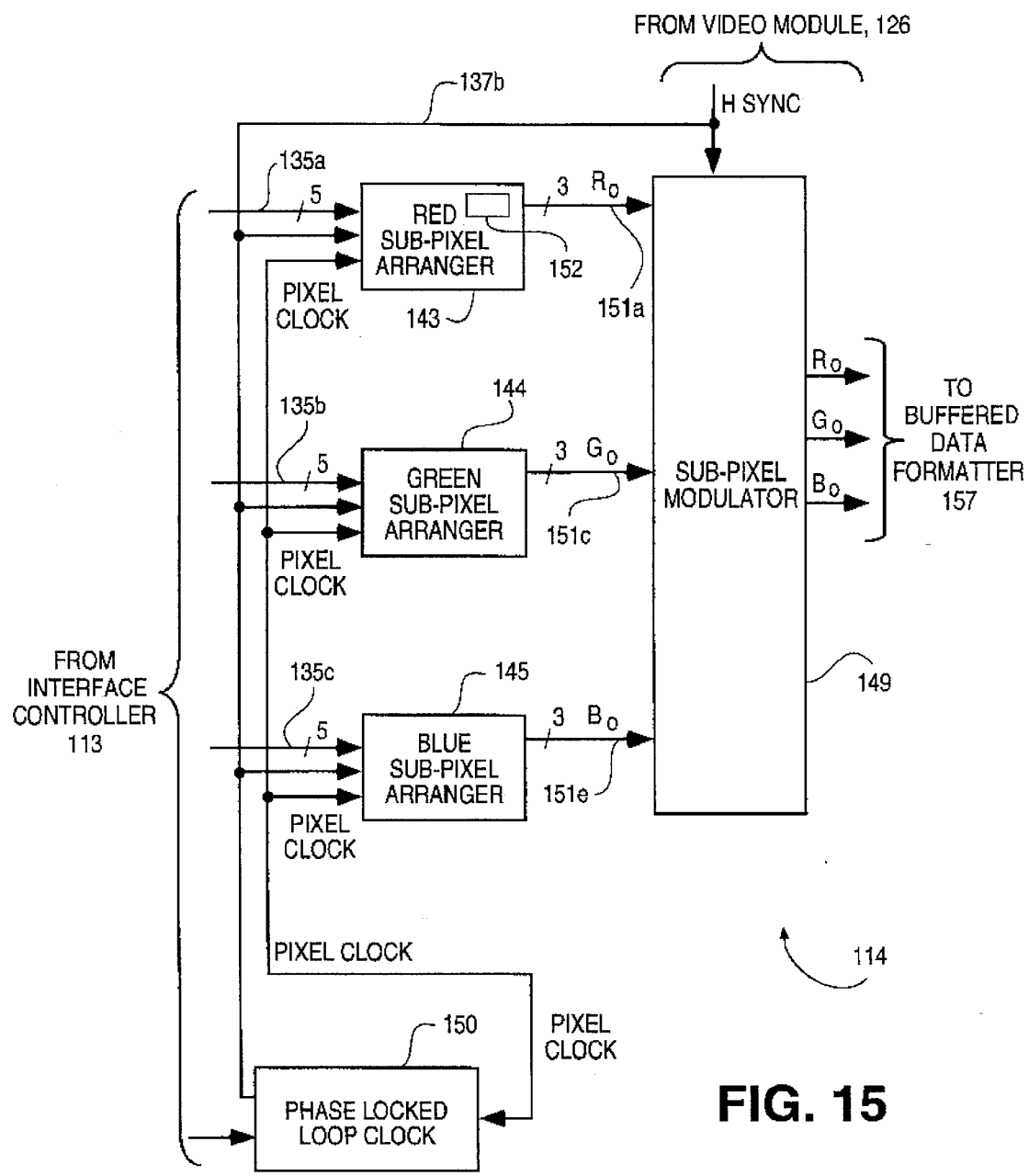
FIG. 15 is a block diagram of an LCD controller of FIG. 14.

Considering now the LCD controller unit 114 in greater detail with reference to FIGS. 14 and 15, the LCD controller unit 114 is similar to controller unit 14 except that it employs a different type sub-pixel-arranger. In this regard, the LCD controller unit 114 generally includes a sub-pixel modulator 149 for modulating single-bit digital signals to drive the passive matrix panel 16, and a set of sub-pixel arrangers, such as a red sub-pixel arranger 143, a green sub-pixel arranger 144 and a blue sub-pixel arranger 145, for establishing sub-pixel image patterns. The sub-pixel arrangers 143–145 are substantially similar to sub-pixel arrangers 43–45 except they do not include a bit map memory. In this regard, each sub-pixel arranger, such as the sub-pixel arranger 143 includes a pattern logic unit, such as a pattern logic unit 152 that is substantially similar to logic unit 52. In this regard, the logic unit 152 generates a 3-bit gray scale code in response to each 5-bit digital signal received from the interface controller 13.

For the purpose of providing timing signals to format the incoming video information signals for display on the passive matrix panel 116, the LCD controller 114 also includes a phase-lock loop clock module 150. The phase-lock loop clock module 150 generates a pixel clock and is substantially similar to phase lock loop clock 50.

Figure 16:
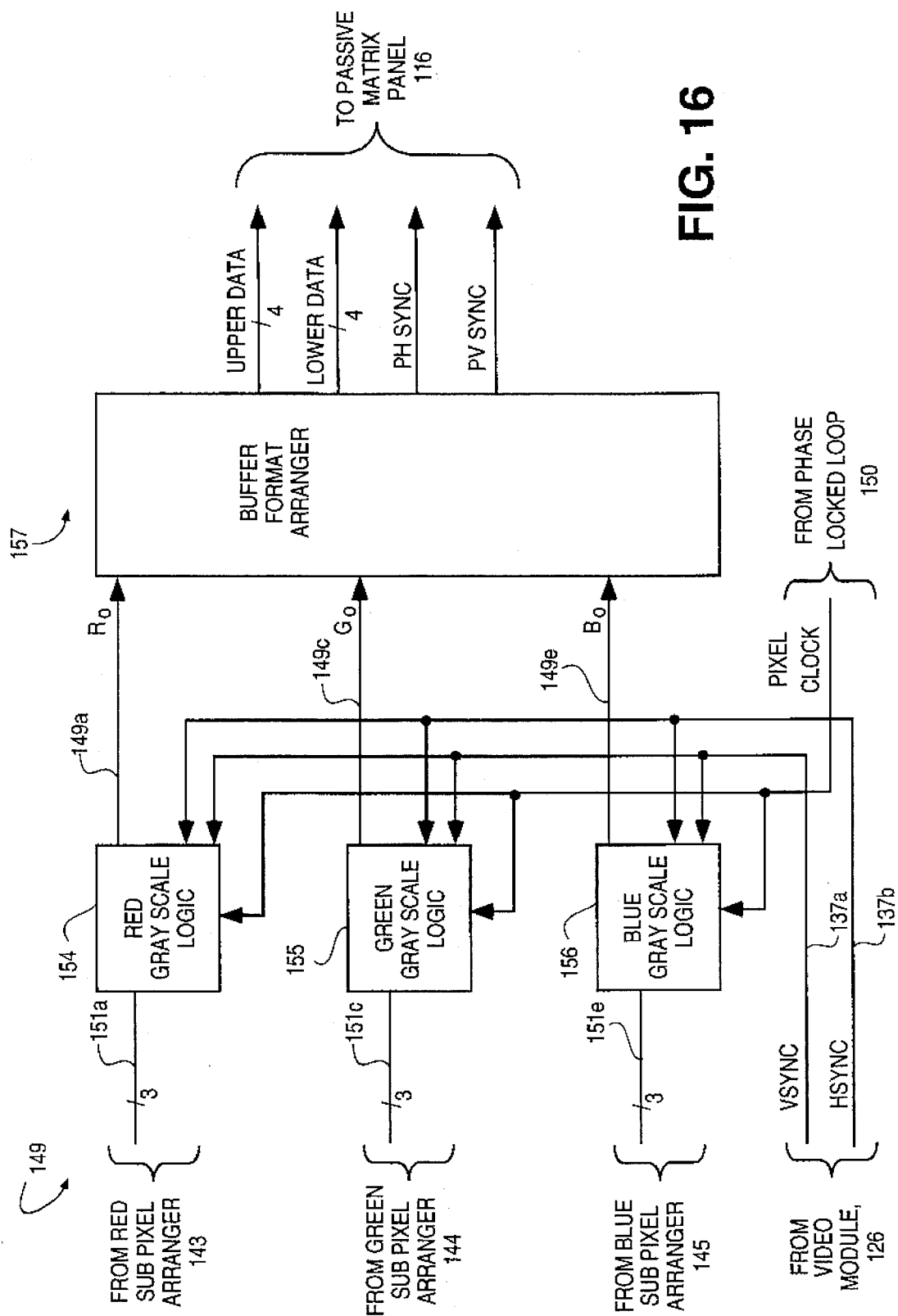
FIG. 16 is a block diagram of a sub-pixel modulator of FIG. 15.

Considering now the sub-pixel modulator 149 in greater detail with reference to FIGS. 14–16, the sub-pixel modulator 149 generally includes a buffered data formatter 157 for assembling the single bit sub-pixel data into groups of single-bit signals for transfer to the passive matrix panel 116 and a set of gray scale logic units, a red gray scale logic unit 154, a green gray scale logic unit 155 and a blue gray scale logic unit 156, for modulating the 3-bit gray scale codes produced by the arrangers 143–145 respectively into single bit digital signals. The arrangers 143–145 are connected to the gray scale logic units 154–156 by a set of conductors 151a, 151c and 151e respectively. As the gray scale logic units 154–156 are substantially similar, only the red gray scale logic unit 154 will be described hereinafter.

Figure 17:
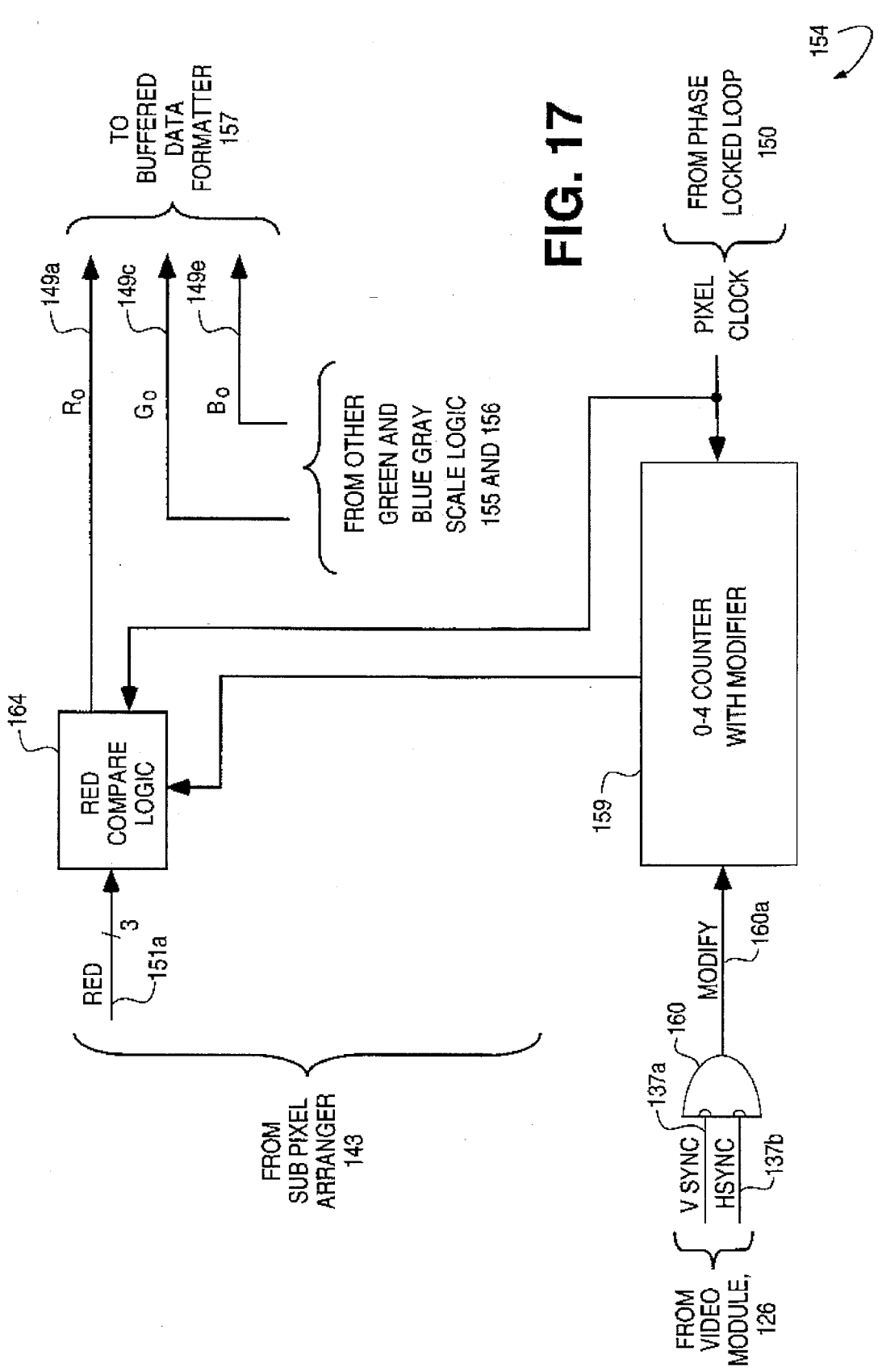
FIG. 17 is a block diagram of a red gray scale logic unit of FIG. 16.

Considering now the red gray-scale logic unit 154 in greater detail with reference to FIG. 17, the red gray scale logic unit 154 generally includes a compare logic unit 164 for comparing the 3-bit digital color code supplied by the sub-pixel arranger 143 with an averaging signal that will be described hereinafter.

The logic unit 154 also includes a counter 159 that generates the series of averaging signals that are supplied to the compare logic unit 164. In this regard, whenever the incoming 3-bit color coded signal has a value greater than a corresponding counter output value, the compare unit 164 generates a single bit output signal.

In order to avoid beat patterns, the logic unit 154 also includes a modifier gate 160 that cause the counting sequence of the counter 159 to be modified on every line and every frame of data.

Figure 18:
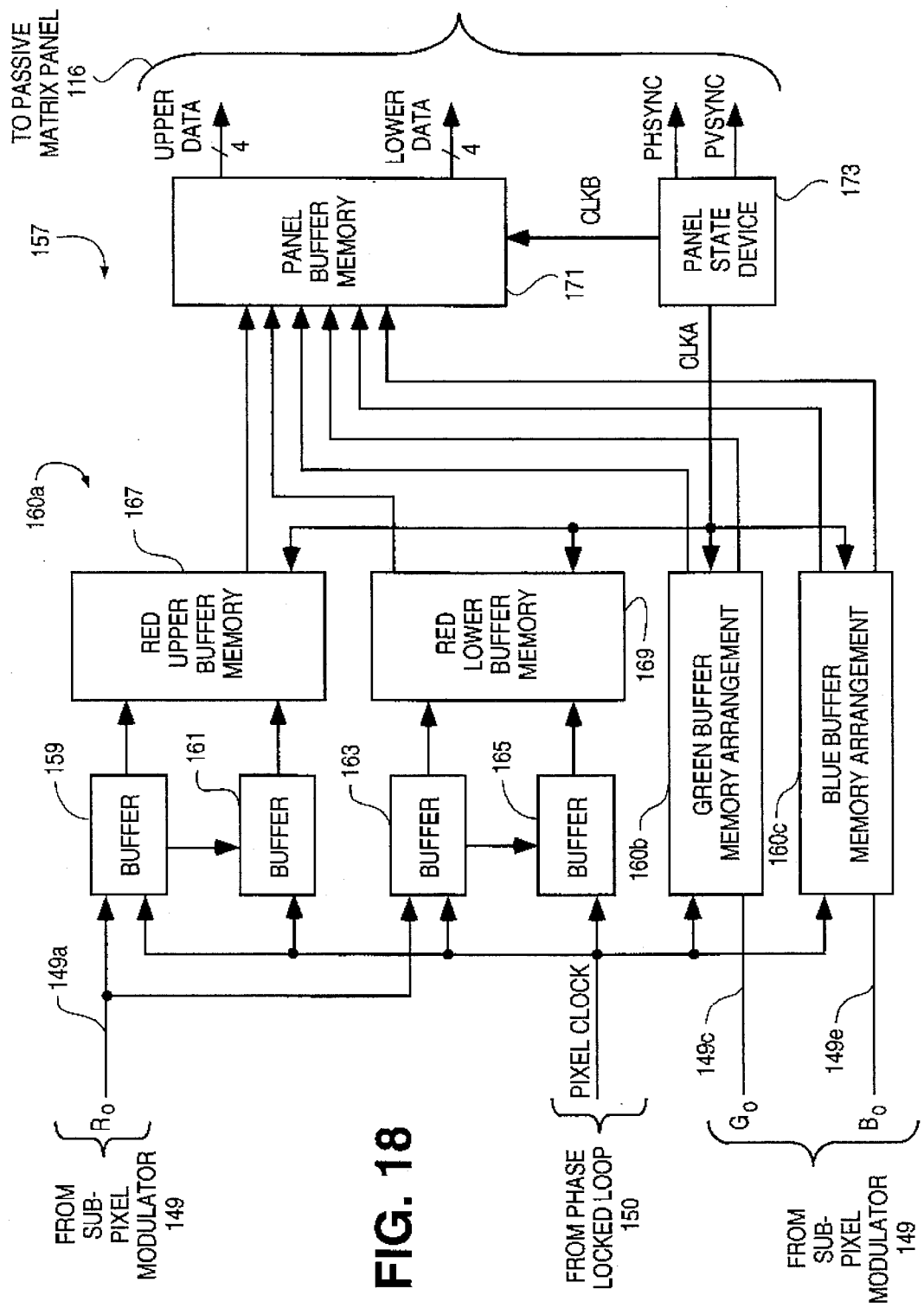
FIG. 18 is a block diagram of a buffered data formatter of FIG. 16.

Considering now the buffered data formatter 157 in greater detail with reference to FIG. 18, the buffered data formatter 157 generally comprises a set of buffer memory arrangements, a red buffer memory arrangement 160A, a green buffer memory arrangement 160B, and a blue buffer memory arrangement 160C, for assembling the data received from the sub-pixel modulator 149 into groupings for driving the passive matrix panel 116. The data formatter 157 also includes a panel buffer memory 171 for temporarily storing the assembled data received from the buffer memory arrangements 160A–C and a panel state device for generating panel synchronization signals (PHSYNC and PVSYNC) and buffer memory timing signals (CLKA and CLKB). In this regard, the panel state device 173 is similar to panel state device 58 but includes a timing generator 175 that is substantially similar to mclock circuit 47 except that it does not generate an mclock signal. As each one of the buffer memory arrangements 160A–C are substantially similar only the red buffer memory arrangement 160A will be described hereinafter in greater detail.

Considering now the red buffer memory arrangement 160A in greater detail with reference to FIG. 18, the red buffer memory arrangement 160A generally includes an upper buffer memory 167 and a lower buffer memory 169 for storing temporarily the 1-bit data signals generated by the red gray scale logic unit 154. In this regard, the upper and lower buffer memory units 167 and 169 store the 1-bit data signals for subsequent transfer to the panel buffer memory 171. In order to assemble the 1-bit data signals from the red gray scale logic unit 154 the red buffer memory unit also includes a set of 1-bit buffer registers 159, 161, 163 and 165.

In operation, when data is transferred to the passive matrix panel 116, data is assembled for driving individual ones of the sub-pixel elements. For example, the following data stream sequence occurs for the first 4 bits of upper panel information, for example $(R_1-G_1-B_1-R_2)$.

In a similar manner, the first 4-bits of lower panel information is, for example $(R_1-G_1-B_1-R_2)$. From the foregoing examples, it will be understood the next 4-bits of upper panel information is $(G_2-B_2-R_3-G_3)$, while the next 4-bits of lower panel information is $(G_2-B_2-R_3-G_3)$.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A display control arrangement, comprising:

means responsive to a series of input intensity level signals indicative of individual ones of a large number of different incoming intensity levels for determining an individual unique one of another large number of a series of different M by N pixel matrix arrays of gray scale intensity level patterns corresponding to a given incoming intensity level;

each one of said patterns having two different desired gray scale intensity levels to help facilitate a blending gradation of color shading levels between pixel images of the same primary color but being generated in response to slightly different incoming intensity levels, each one of the two different gray scale intensity levels being less than its corresponding incoming intensity level, said two different gray scale intensity levels differing by at least one gray scale intensity level;

means for determining an individual one of said two different desired gray scale intensity levels for a selected pixel element in a determined pattern; and means responsive to the determined desired gray scale intensity level of said two different gray scale intensity levels for said selected pixel element for causing the selected pixel element to be activated selectively to facilitate pixel image perception at the determined desired gray scale intensity level;

whereby said patterns of two different gray scale intensity levels for any single incoming intensity level signal cause adjacent pixel images of the same primary color but having somewhat different gray scale intensity levels to blend in a subtle gradation of intensity levels.

2. A display control arrangement, according to claim 1, wherein said pixel control means includes:

a plurality of pattern logic means for producing a plurality of color code signals indicative of desired gray scale color shading levels for at least two separate and distinct primary colors; and bit map memory means responsive to said pattern logic means for storing said plurality of color code signals in a pattern array for helping to blend color shading levels for the same primary color.

3. A display control arrangement, according to claim 1, further comprising:

interface means coupled to said intensity level means for receiving desired color shading level signals and for formatting said desired color shading level signals to cause the individual color images in the plurality of different color images to be displayed by the display device.

4. A display control arrangement according to claim 1, further comprising:

intensity level means for determining whether or not individual pixel elements in a group of pixel elements are to be activated selectively an average number of times over a large number of consecutive frame time intervals to generate pixel images having substantially the same perceived gray scale color shading level N, where N is one of a large number of different gray scale shading levels; and for determining whether or not individual pixel elements of another group of pixel elements are to be activated selectively an average number of times over said large number of consecutive frame time intervals to generate pixel images having substantially the same perceived gray scale color shading level M, where the gray scale shading level M is another one of said large number of different gray scale shading levels and can be perceived as a substantially different gray scale color shading level than said gray scale color shading level N;

duty cycle means for causing selected individual ones of the pixel elements in said group of pixel elements and individual ones of the pixel element in said another group of pixel elements to be activated selectively an average number of times over a large number of consecutive frame time intervals to generate pixel images defining color shading level patterns to substantially reduce contouring in perceived color shading level differences between pixel images disposed near one another.

5. A display control arrangement, according to claim 4, wherein said duty cycle means includes:

counter means for providing a series of intensity level averaging signals, said averaging signals being arranged in a certain arranged order to help prevent beat patterns in the plurality of different color images;

modifying means for causing said certain arranged order to be changed periodically; and comparing means for determining whether said desired color shading level signal is greater than a corresponding intensity level averaging signal in said series of signals and for generating a single bit digital signal whenever said desired color shading level signal is greater than said corresponding intensity level averaging signal.

6. A display control arrangement according to claim 5, wherein said certain arranged order is changed during every line in the matrix of sub-pixel elements.

7. A display control arrangement, according to claim 6, wherein said certain arranged order is changed during every one of the frame time intervals in said large number of consecutive frame time intervals.

8. A display control arrangement according to claim 4, wherein said intensity level means includes:

means for determining an individual unique one of a series of duty cycle intensity level patterns, said patterns containing more than two duty cycle intensity levels, wherein at least some of said patterns are each arranged in an M by N pixel matrix array of intensity levels including at least two different duty cycle intensity levels differing by at least one duty cycle intensity level to reduce substantially contouring effects between adjacent pixel images of the same primary color but having different desired incoming intensity levels;

means responsive to the determined duty cycle intensity level pattern for determining an individual one of the duty cycle intensity levels of the determined pattern in accordance with the selected pixel element address location to generate a single duty cycle intensity level signal; and wherein said duty cycle means includes means responsive to said single duty cycle level signal determined from the selected pattern for causing said selected pixel element to be activated selectively depending upon an overall average large number, substantially greater than eight consecutive frame cycles to cause a pixel image perception at said incoming desired intensity level;

whereby a subtle intensity gradation is achieved in the image to be displayed between groups of pixel images having somewhat different intensity levels.

9. A display control arrangement according to claim 8, wherein said series of duty cycle intensity level patterns includes at least two fixed composite pixel patterns.

10. A display control arrangement according to claim 9, wherein one of said fixed composite pixel patterns includes a group of pixel images having the same color intensity level.

11. A display control arrangement according to claim 9, wherein one of said fixed composite pixel pattern includes a group of pixel images having the same intensity level and a single pixel image having an intensity level substantially less than said group of pixel images.

12. A display control arrangement according to claim 9, wherein one of said fixed composite pixel pattern includes one area of pixel images having the same intensity level and another area of pixel images including at least a single pixel image having an intensity level substantially greater than the first mentioned area of pixel images.

13. A display control arrangement according to claim 9, wherein one of said fixed composite pixel pattern includes a group of pixel images having the same intensity level and a pair of pixel images having an intensity level substantially less than said group of pixel images.

14. A display control arrangement according to claim 9, wherein one of said fixed composite pixel pattern includes one area of pixel images having the same intensity level and another area of pixel images having at least a pair of pixel images having an intensity level substantially greater than the first-mentioned area of pixel images.

15. A display control arrangement according to claim 9, wherein one of said fixed composite panel patterns includes a single pixel image at said desired color intensity level and a group of pixel images at another desired color intensity level substantially less than said desired color intensity level.

16. A display control arrangement according to claim 9, wherein one of said fixed composite panel patterns includes an area of pixel images including at least a single pixel image at said desired color intensity level and another area of pixel images at another desired color intensity level substantially greater than said desired color intensity level.

17. A display control arrangement according to claim 1, wherein each pattern is arranged in an M by N pixel array.

18. A display control arrangement according to claim 1, further including patterns having only three or four levels of said different desired gray scale intensity levels, where one gray scale level is assigned for the last mentioned pattern.

19. A display control arrangement according to claim 1, wherein the intensity gray scale levels include at least eight desired intensity levels.

20. A display control arrangement, comprising:

truth table means for storing a series of different patterns of groups of gray scale intensity levels, each pattern having at least three desired gray scale intensity levels, each one of said patterns corresponding individually to one of a series of incoming intensity levels, where the individual desired intensity levels within a given pattern are each generally smaller than their corresponding incoming intensity level each group of gray scale intensity levels including two different gray scale intensity levels differing by only one desired gray scale intensity level;

wherein only one of said desired gray scale intensity levels for each pattern is increased by only one gray scale intensity level for each corresponding increasing incoming intensity level value in said series of incoming intensity levels to help facilitate a blending gradation of color shading levels between pixel images of the same primary color but having different incoming intensity levels;

means responsive to a given incoming intensity level for determining one of said patterns for any given display frame cycle;

means for selecting one of said desired gray scale intensity levels of the determined pattern depending upon the address of a given pixel for said any given display frame cycle; and means for activating said given pixel element at the selected desired gray scale intensity level for said any given display frame cycle;

whereby the color shading level patterns between pixel images having somewhat the same intensity level are blended in a subtle arrangement to substantially reduce contouring in the perceived color shading level differences whenever the last mentioned pixel images are displayed near one another.

21. A display control arrangement according to claim 20, wherein said series of different patterns includes a series of at least four different patterns.

22. A display control arrangement according to claim 20, wherein said series of different patterns includes a series of at least five different patterns.

23. A display control arrangement according to claim 20, wherein said series of incoming intensity levels includes at least eight incoming intensity levels.

24. A display control arrangement according to claim 20, wherein said series of incoming intensity levels includes at least thirty-one incoming intensity levels.

25. A display control arrangement according to claim 20, wherein said series of patterns are recurring over P number of contiguous incoming intensity levels.

26. A display control arrangement according to claim 25, wherein said P number is at least 5.

27. A method for controlling a displayed image to help reduce contouring between pixel images having somewhat different shading levels in the same primary color, comprising:

storing a series of different patterns of groups of gray scale intensity levels, each pattern having at least three desired gray scale intensity levels, each one of said patterns corresponding individually to one of a series of incoming intensity levels, where the individual desired intensity levels within a given pattern are each generally smaller than their corresponding incoming intensity level;

wherein each group of gray scale intensity levels includes two different gray scale intensity levels differing by only one desired gray scale intensity level;

wherein only one of said desired gray scale intensity levels for each pattern is increased by only one level corresponding to each corresponding increasing incoming intensity level value in said series of incoming intensity levels to help facilitate a blending gradation of color shading levels between pixel images of the same primary color but having different incoming intensity levels;

determining one of said patterns for any given display frame cycle in response to a given incoming intensity level;

selecting one of said desired gray scale intensity levels of the determined pattern depending upon the address of a given pixel element for said any given display frame cycle; and activating said given pixel element at the selected desired gray scale intensity level for said any given display frame cycle;

whereby the color shading level patterns between pixel images having somewhat the same intensity level are blended in a subtle arrangement to substantially reduce contouring in the perceived color shading level differences whenever the last mentioned pixel images are displayed near one another.

28. A method according to claim 27, further comprising:

driving a display device having a matrix of sub-pixel elements to help reduce contouring lines within a plurality of different color images of a common primary color; and generating energizing signals for driving individual ones of the sub-pixel elements on and off to form one of the plurality of different color images.

29. A method according to claim 28, further comprising:

actuating desired ones of the sub-pixel elements selectively an average number of times over a large number of consecutive frame time intervals to generate sub-pixel images having desired perceived color shading levels.

* * * * *

UNITED STATES PATENT AND TRADEMARK OFFICE
CERTIFICATE OF CORRECTION

PATENT NO. : 5,543,819
APPLICATION NO. : 08/155480
DATED : August 6, 1996
INVENTOR(S) : Randall S. Farwell et al.

Page 1 of 1

It is certified that error appears in the above-identified patent and that said Letters Patent is hereby corrected as shown below:

Column 1
Lines 11-12, "...Apr. 3, 1991..." should read --...April 23, 1991...--.

Column 1
Lines 19-20, "...No. 5,181,902..." should read --...No. 5,225,875...--.

Signed and Sealed this

Seventeenth Day of November, 2009

David J. Kappos
*Director of the United States Patent and Trademark Office*